(12) United States Patent
Chappellet et al.

(10) Patent No.: US 12,534,670 B2
(45) Date of Patent: Jan. 27, 2026

(54) LIQUID CRYSTAL COMPOUNDS

(71) Applicant: ROLIC TECHNOLOGIES AG, Allschwil (CH)

(72) Inventors: Sabrina Chappellet, Allschwil (CH); Tobias Von Arx, Allschwil (CH)

(73) Assignee: ROLIC TECHNOLOGIES AG, Allschwil (CH)

( * ) Notice: Subject to any disclaimer, the term of this patent is extended or adjusted under 35 U.S.C. 154(b) by 0 days.

(21) Appl. No.: 18/700,314

(22) PCT Filed: Nov. 25, 2022

(86) PCT No.: PCT/EP2022/083261
§ 371 (c)(1),
(2) Date: Apr. 11, 2024

(87) PCT Pub. No.: WO2023/104545
PCT Pub. Date: Jun. 15, 2023

(65) Prior Publication Data
US 2025/0066666 A1    Feb. 27, 2025

(30) Foreign Application Priority Data
Dec. 8, 2021 (EP) .................................. 21213022

(51) Int. Cl.
| | | |
|---|---|---|
| *G02F 1/1333* | (2006.01) | |
| *C09K 19/12* | (2006.01) | |
| *C09K 19/18* | (2006.01) | |
| *C09K 19/20* | (2006.01) | |
| *C09K 19/32* | (2006.01) | |
| *C09K 19/34* | (2006.01) | |

(52) U.S. Cl.
CPC .......... *C09K 19/2007* (2013.01); *C09K 19/12* (2013.01); *C09K 19/18* (2013.01); *C09K 19/322* (2013.01); *C09K 19/3497* (2013.01); *C09K 2019/122* (2013.01); *C09K 2019/181* (2013.01); *C09K 2019/2035* (2013.01); *C09K 2019/2078* (2013.01); *C09K 2019/323* (2013.01)

(58) Field of Classification Search
CPC ................ C09K 19/38; C09K 19/3804; C09K 2019/0444; C09K 2019/181; C09K 2019/2092; G02F 1/1333
See application file for complete search history.

(56) References Cited

U.S. PATENT DOCUMENTS

| | | |
|---|---|---|
| 5,798,147 A | 8/1998 | Beck et al. |
| 2021/0002556 A1 | 1/2021 | Goto |
| 2024/0182785 A1* | 6/2024 | Fukushima .......... C09K 19/322 |
| 2025/0066666 A1* | 2/2025 | Chappellet ............ C09K 19/12 |

FOREIGN PATENT DOCUMENTS

| | | |
|---|---|---|
| EP | 1 090 325 A1 | 4/2011 |
| EP | 3 187 566 A1 | 7/2017 |
| KR | 10-2011-0094944 A | 8/2011 |
| WO | 2012/085048 A1 | 6/2012 |
| WO | 2020/207709 A1 | 10/2020 |

OTHER PUBLICATIONS

International Search Report issued Mar. 27, 2023 in International Application No. PCT/EP2022/083261.

* cited by examiner

*Primary Examiner* — Geraldina Visconti
(74) *Attorney, Agent, or Firm* — Sughrue Mion, PLLC

(57) ABSTRACT

The invention relates to novel polymerizable liquid crystals of formula (I),

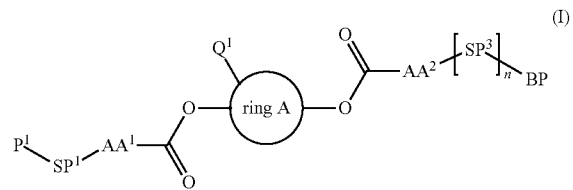

to LCP mixtures comprising these compounds and to their uses for optical and electro-optical devices.

17 Claims, No Drawings

LIQUID CRYSTAL COMPOUNDS

CROSS-REFERENCE TO RELATED APPLICATIONS

This is a National Stage of International Application No. PCT/EP2022/083261 filed Nov. 25, 2022, claiming priority based on European Patent Application No. 21213022.3 filed Dec. 8, 2021.

The present invention relates to a laterally substituted curable liquid crystal (LCP) with high optical anisotropy and the use of such LCPs in the preparation of substantially uniform or patterned film in which the orientation of the LCP molecules can be controlled.

In the display industry optical LCP films are used for the provision or enhancement of optical or electro optical effects, such as for polarizers. Displays are getting more and more thinner. Hence, there is a growing demand from this industry for thinner optical LCP films, such as retardation films, providing the desired optical or electro-optical effects.

Retardation films are a type of optical elements which change the polarization state of light passing through the same. When light passes through a phase retarder its polarization direction changes because of the birefringence and the thickness of the phase retarder. One of the biggest issues in preparation of phase retarders is to prepare high performing films at a small charge. When liquid crystals having high birefringence are used, it is possible to realize the necessary retardation value with small quantities of liquid crystals compounds. LCP materials with high birefringence could give access to thin optical films, especially thin retardation films.

Therefore, it was the task of the present invention to search for new LCP material having high birefringence, which are applicable for optical films.

A first aspect of the present invention provides a compound, preferably a liquid crystal, of formula (I)

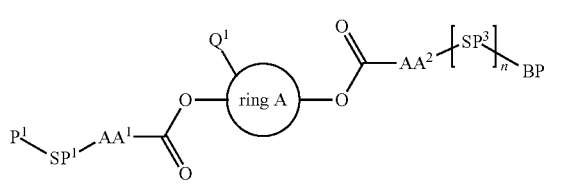

(I)

wherein
the ring A is an unsubstituted or substituted phenylene group, naphthalene group or biphenylene group, preferably the ring A is an unsubstituted or substituted 1,4-phenylene group, 2,6-naphthalene group, 1,4-naphthalene group, 1,5-naphthalene group or 4,4'-biphenylene; and more preferably the ring A is an unsubstituted or substituted 1,4-phenylene group or 1,4-naphthalene group, $AA^1$ is selected from the group of compounds below:

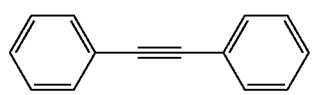

(a)

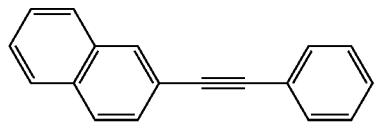

(b)

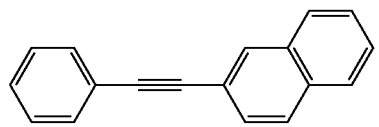

(c)

$AA^2$ is or selected from the group of compounds below:

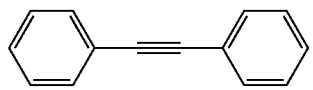

(a)

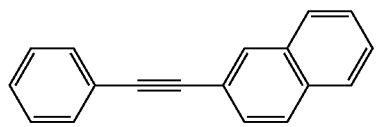

(b)

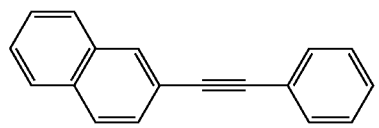

(c)

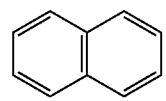

(d)

(e)

wherein $AA^1$ and $AA^2$ are independently from each other unsubstituted or substituted with one or two substituents selected from the group consisting of F, Cl, Br, I, CN, $C_1$-$C_6$alkyl, $C_1$-$C_6$ alkenyl, $C_1$-$C_6$alkoxy and $C_1$-$C_6$alkenyloxy, $Q^1$ is an unsubstituted or substituted homocyclic or heterocyclic group, which are preferably selected from the group consisting of 1,4-phenylene, pyridine-2,5-diyl, pyrimidine-2,5-diyl, trans-1,4-cyclohexylene, trans-1,3-dioxane-2,5-diyl, 1,4-naphthalenediyl and 2,6-naphthalenediyl, benzofurane, benzothiazole and benzimidazole; and more preferably $Q^1$ is selected from the group consisting of 1,4-phenylene, 1,4-naphthalenediyl, 2,6-naphthalenediyl, benzofurane, benzothiazole and benzimidazole; and especially more preferred $Q^1$ is selected from benzofuran, benzothiazole, benzimidazole; or especially most preferred $Q^1$ is benzothiazole or benzimidazole; or $Q^1$ is selected from a group of unsubstituted or substituted compounds of formulae (Ia), (Ib), (Ic) and (Id):

—COO—$SP^2$—BB (Ia), —OCO—$SP^2$—BB (Ib), —CO—$SP^2$—BB (Ic) and —O—$SP^2$—BB (Id), and especially most preferred $Q^1$ is selected from —COO—$SP^2$—BB (Ia);

with the proviso that the substituents of $Q^1$ are selected from the group consisting of F, Cl, Br, I, CN, $C_1$-$C_6$alkyl, $C_1$-$C_6$ alkenyl, $C_1$-$C_6$alkoxy and $C_1$-$C_6$alkenyloxy; and with the proviso that if the ring A is a naphthalene group $Q^1$ has the above given meaning or is hydrogen;

$SP^1$, $SP^2$ and $SP^3$ independently from each other represents a single bond or a spacer group of the formula —$(CH_2)p$- in which p is an integer of 1 to 18 and in which one, two, three or four —$CH_2$— groups are unreplaced or replaced by a group selected from the group consisting of —CH=CH—, —O—, —S—, —CO—, —COO—, —CONR'—, —OCOO—, —OCONR', —NR'—, —CONR'—, —OCOO—, —OCONR', wherein R' is selected from the group consisting of hydrogen, a $C_1$-$C_6$ alkyl group and a $C_1$-$C_6$ alkenyl group; with the proviso that the spacer group does not contain two adjacent heteroatoms; preferably $SP^1$ and $SP^3$ each independently from each other represents a single bond or a spacer group of the formula —$(CH_2)p$- in which p is an integer of 1 to 12, preferably an integer from 1 to 6, and in which one —$CH_2$— group is unreplaced or replaced by a group selected from the group consisting of —O— or —S—; preferably $SP^2$ represents a single bond or a spacer group of the formula —$(CH_2)p$- in which p is an integer of 1 to 12, preferably an integer from 1 to 10, and in which one —$CH_2$— group is unreplaced or replaced by a group selected from the group consisting of —O— or —S—;

n is 0 or 1, preferably 1,

BP is a polymerizable group or F, Cl, Br, I, CN, $C_1$-$C_6$alkyl, $C_1$-$C_6$ alkenyl, $C_1$-$C_6$alkoxy or $C_1$-$C_6$alkenyloxy, preferably BP is CN, I, or a polymerizable group $P^1$ is a polymerizable group, with the proviso that if BP and $P^1$ are polymerizable groups, they are identical or different;

BB is hydrogen or a compound of formula (II)

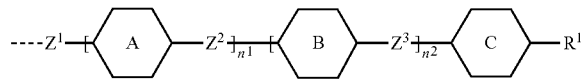

(II)

in which

A and B independently represent an unsubstituted or substituted six membered homocyclic or heterocyclic group or a naphthalene group;

C is selected from the group consisting of a five and six membered homocyclic or heterocyclic group or a naphthalene group;

$n^1$ and $n^2$ are 0 or 1 with the proviso that firstly $1 \leq n^1 + n^2 \leq 2$ and secondly, when C is a naphthalene group $0 \leq n^1 + n^2 \leq 2$; preferably $n^1$ is 1 and $n^2$ is 0;

$Z^1$ is selected from the group consisting of —O—, —S—, —COO—, —OOC—, —CO—, —CONR'—, —NR'CO—, —OCOO—, —OCONR'—, —NR'COO— and a single bond; in which R' is selected from the group consisting of hydrogen, a $C_1$-$C_6$ alkyl group and a $C_1$-$C_6$ alkenyl group; preferably $Z^1$ is —O—, —COO—, —OOC— or a single bond;

with the proviso that the —$SP^2$—$Z^1$— group does not contain two adjacent heteroatoms;

$Z^2$ and $Z^3$ are independently from each other selected from the group consisting of single bond, —COO—, —OOC—, —$CH_2$—$CH_2$—, —$CH_2O$—, —$OCH_2$—, —CH=CH—, —C≡C—, —$(CH_2)_4$— and —$(CH_2)_3O$—; preferably $Z^2$ and $Z^3$ are independently selected from the group consisting of single bond, —COO— and —OOC—;

$R^1$ is selected from the group consisting of H, —CN, —COR, —COOR, —OCOR, —CONR'R, —NR'COR, OCOOR, —OCONR'R, —NR'COOR, —F, —Cl, I, —$CF_3$, —$OCF_3$, —OR and preferably selected from the group consisting of H, —CN and I, in which R' is selected from the group consisting of hydrogen, a $C_1$-$C_6$ alkyl group and a $C_1$-$C_6$ alkenyl group, and R is selected from the group consisting of hydrogen, a $C_{1-18}$alkyl group and a $C_{4-18}$alkenyl group with the double bond at 3-position or higher, preferably higher is at 4, 5, 6, 7, 8, 9, 10, -position.

The spacer group $SP^1$, $SP^2$ and $SP^3$ each independently from each other is unsubstituted or substituted by one or more fluorine or chlorine atoms. Spacer groups in which there are no substituent groups present are preferred.

The groups A and B are saturated, unsaturated alicyclic groups or aromatic groups. They are unsubstituted or substituted by one or two substituents selected from the group consisting of F, Cl, CN, a lower alkyl, lower alkenyl, lower alkoxy and lower alkenyloxy. Preferably the groups A and B each contain no more than one substituent. It is especially preferred that the groups A and B contain no substitution.

It is preferred that the groups A and B are selected from the group consisting of 1,4-phenylene, biphenylene, pyridine-2,5-diyl, pyrimidine-2,5-diyl, trans-1,4-cyclohexylene or trans-1,3-dioxane-2,5-diyl, bicycloxylene, 1,4-naphthalenediyl and 2,6-naphthalenediyl. Is it especially preferred that A and B are selected from the group consisting of 1,4-phenylene, trans-1,4-cyclohexylene and 2,6-naphthalenediyl.

The group C is a saturated, unsaturated alicyclic group or an aromatic group. It is optionally substituted with one or two substituents selected from the group consisting of F, Cl, CN, a lower alkyl, lower alkenyl, lower alkoxy and lower alkenyloxy. It is preferred that the group C contains at most one substituent. It is especially preferred that the group C contains no substitution.

It is preferred that the group C is selected from furan-2, 4-diyl, furan-2,5-diyl, tetrahydrofuran-2,4-diyl, tetrahydrofuran-2,5-diyl, dioxolane-2,4-diyl, dioxolane-2,5-diyl, oxazole-2,4-diyl, oxazole-2,5-diyl, cyclopentane-1,3-diyl, cyclopentane-1,4-diyl, 1,4-phenylene, pyridine-2,5-diyl, pyrimidine-2,5-diyl, trans-1,4-cyclohexylene or dioxane-2, 5-diyl, 1,4-naphthalenediyl, 1,3-naphthalenediyl, 1,5-naphthalenediyl, 1,6-naphthalenediyl, 1,7-naphthalenediyl, 2,3-naphthalenediyl, 2,4-naphthalenediyl, 2,5-naphthalenediyl, 2,6-naphthalenediyl, 2,7-naphthalenediyl, and 2,8-naphthalenediyl. It is especially preferred that C is selected from the group consisting of furan-2,5-diyl, tetrahydrofuran-2,5-diyl, oxazole-2,5-diyl, 1,4-phenylene, trans-1,4-cyclohexylene, and 2,6-naphthalenediyl, and especially more preferred C is 1,4-phenylene.

Polymerizable groups of BP and $P^1$ are each independently from each other are preferably selected from the group consisting of $CH_2$=C(Ph)-, $CH_2$=CW—COO—, $CH_2$=CH—COO-Ph-, $CH_2$=CW—CO—NH—, $CH_2$=CH—O—, $CH_2$=CH—OOC—, Ph-CH=CH—, $CH_2$=CH-Ph-, $CH_2$=CH-Ph-O—, $R_6$-Ph-CH=CH—COO—, $R_6$—OOC—CH=CH-Ph-O— and 2-W-epoxyethyl, in which W represents hydrogen, chloride, aryl or a $C_1$-$C_6$alkyl,
$R_6$ represents a $C_1$-$C_6$alkyl with the proviso that when $R_6$ is attached to an aryl group it may also represent hydrogen or a $C_1$-$C_6$alkoxy.

Polymerizable groups of BP and $P^1$ are independently from each other are especially preferred selected from the group consisting of $CH_2$=CW—COO—, $CH_2$=CH—O—, and $CH_2$=CH—OOC—, in which W represents hydrogen, chloride, aryl or a $C_1$-$C_6$alkyl, preferably hydrogen or a $C_1$-$C_6$alkyl.

By the term "lower alkyl" it should be understood to include a $C_{1-6}$ achiral, branched or straight-chained alkyl group. Examples of lower alkyl groups that may be present in the compounds of the invention include methyl, ethyl, propyl, butyl, pentyl hexyl and the like.

By the term "lower alkenyl" it should be understood to include $C_{3-6}$ achiral, branched or straight-chained alkenyl group in which the double bond is at position 2- or higher. Examples of lower alkenyl groups that may be present in the compounds of the invention include 2-propenyl, 3-butenyl, 3-isopentenyl, 4-pentenyl, 5-hexenyl, 4-isohexenyl and the like.

By the term "lower alkoxy" it should be understood to include $C_{1-6}$ achiral, branched or straight-chained alkoxy group. Examples of lower alkoxy groups that may be present in the compounds of the invention include methoxy, ethoxy, propoxy, butoxy, pentoxy hexoxy and the like.

By the term "alkenyloxy" it should be understood to include $C_{3-6}$ achiral, branched or straight-chained alkenyloxy group in which the double bond is at position 2- or higher. Examples of lower alkenyloxy groups that may be present in the compounds of the invention include 2-propenyloxy, 3-butenyloxy, 4-pentenyloxy, 5-hexenyloxy and the like.

The starting materials are commercially available or may be readily prepared and are well known to a skilled person.

Preferred, the present invention provides a compound, preferably a liquid crystal, of formula (I), wherein
the ring A is an unsubstituted or substituted phenylene group, preferably a 1,4-phenylene group, or a naphthalene group;
$AA^1$ is selected from the group of compounds below:

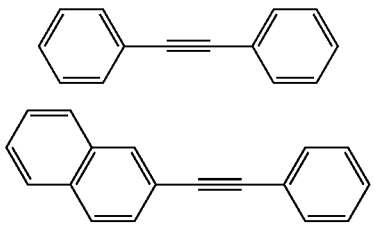

(a)

(b)

$AA^2$ is $C_1$-$C_4$alkylene, an alicyclic group or selected from the group of compounds below:

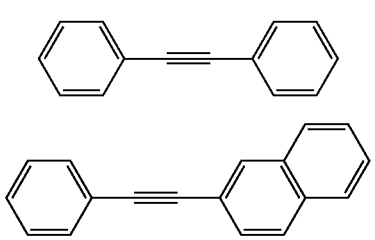

(a)

(b)

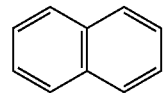

(d)

(e)

$Q^1$ is an unsubstituted or substituted group selected from the group consisting of benzofurane, benzothiazole and benzimidazole; preferably $Q^1$ is benzothiazole or benzimidazole, or $Q^1$ is selected from a group of formula (Ia): —COO—$SP^2$—BB, with the proviso that the substituents of $Q^1$ are selected from the group consisting of F, Cl, Br, I, CN, $C_1$-$C_6$alkyl, $C_1$-$C_6$ alkenyl, $C_1$-$C_6$alkoxy and $C_1$-$C_6$alkenyloxy; and with the proviso that if the ring A is a naphthalene group, $Q^1$ has the above given meaning or is hydrogen;

$SP^1$ and $SP^3$ independently from each other represents a single bond or a spacer group of the formula —$(CH_2)_p$- in which p is an integer of 1 to 12, preferably an integer from 1 to 6, and in which one —$CH_2$— group is unreplaced or replaced by a group selected from the group consisting of —O— or —S—; and $SP^2$ represents a single bond or a spacer group of the formula —$(CH_2)_p$- in which p is an integer of 1 to 12, preferably an integer from 1 to 10, and in which one —$CH_2$— group is unreplaced or replaced by a group selected from the group consisting of —O— or —S—;

n is 0 or 1 and

BP is a polymerizable group, or $C_1$-$C_4$alkyl, I or —CN,
$P^1$ is a polymerizable group,
wherein a polymerizable group is selected from the group consisting of $CH_2$=C(Ph)-, $CH_2$=CW—COO—, $CH_2$=CH—COO-Ph-, $CH_2$=CW—CO—NH—, $CH_2$=CH—O—, $CH_2$=CH—OOC—, Ph-CH=CH—, $CH_2$=CH-Ph-, $CH_2$=CH-Ph-O—, $R_6$-Ph-CH=CH—COO—, $R_6$—OOC—CH=CH-Ph-O— and 2-W-epoxyethyl, in which W represents hydrogen, chloride, aryl or a $C_1$-$C_6$alkyl, preferably W is hydrogen; more preferably a polymerizable group is $CH_2$=CW—COO—, in which W represents hydrogen, $R_6$ represents a $C_1$-$C_6$alkyl with the proviso that when $R_6$ is attached to an aryl group it may also represent hydrogen or a $C_1$-$C_6$alkoxy, with the proviso that if BP, and $P^1$ are polymerizable groups they may be the same or different, and BB is hydrogen or a compound of formula (II)

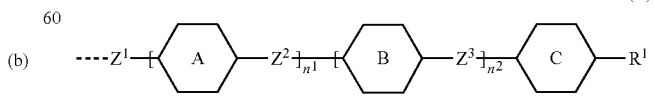

(II)

in which
A and B independently represent an unsubstituted or substituted 1,4-phenylene group or naphthalene group;

preferably A and B independently represent an unsubstituted or substituted 1,4-phenylene group, C is unsubstituted or substituted 1,4-phenylene group or naphthalene group; preferably C is unsubstituted or substituted 1,4-phenylene group, $n^1$ and $n^2$ are 0 or 1 with the proviso that firstly $1 \leq n^1+n^2 \leq 2$ and secondly, when C is a naphthalene group $0 \leq n^1+n^2 \leq 2$; preferably $n^1$ is 1 and $n^2$ is 0, $Z^1$ is selected from the group consisting of —O—, —COO—, —OOC—, —CO—, and a single bond;

with the proviso that the —$SP^2$—$Z^1$— group does not contain two adjacent heteroatoms;

$Z^2$ and $Z^3$ are independently selected from the group consisting of a single bond, —COO— and —OOC—; preferably $Z^2$ and $Z^3$ are independently a single bond, and $R^1$ is selected from the group consisting of H, —CN and I, preferably $R^1$ is —CN.

More preferred, the present invention provides a compound, preferably a liquid crystal, of formula (I), wherein $AA^1$ and $AA^2$, $SP^1$ and $SP^1$ and $P^1$ and BP are identical, or, wherein $AA^2$ is 1,4-phenylene, n is 0 and the ring A, $AA^1$, $Q^1$, $SP^1$, $SP^2$, $SP^3$, BP and $P^1$ have the meaning as given above, and preferably BP represents the halogen I.

A LCP material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer. Polymerization may be initiated by thermal treatment or by exposure to actinic light, which preferably comprises UV-light. A LCP-material may comprise only a single type of liquid crystal compound, but may also comprise additional polymerizable and/or non-polymerizable compounds, wherein not all of the compounds have to be liquid crystal compounds. Further, an LCP material may contain additives, including but not limited to antioxidants, initiators, such as photoinitiators, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, such as e.g. phenol derivatives, such as 4-ethoxyphenol or 2,6-di-tert-butyl-4-methylphenol (BHT), lubricating agents; dispersing agents; a polymeric binder and/or monomeric compounds which can be converted into the polymeric binder by polymerization, or, in the case of emulsion coatings and printing inks, a dispersion auxiliary, such as disclosed in U.S. Pat. No. 5,798,147; hydrophobing agents, adhesive agents, flow improvers, defoaming agents, deaerators, diluents, auxiliaries, colorants, dyes and pigments, curing inhibitors, such as hydroquinone, p-tert.-butyl catechol; 2,6-di tert.-butyl-p-methylphenol; phenothiazine; N-phenyl-2-naphthylamine; or a photo-orientable monomer or oligomer or polymer as described in EP 1 090 325 B, a chiral additive, isotropic or anisotropic fluorescent and/or non-fluorescent dyes, in particular dichroic dyes.

It will be appreciated that the compounds of the invention may be used in the preparation of LCP mixtures. Such mixtures may be prepared by admixing a compound of formula (I) with one or more additional components. An organic solvent may also be used in the preparation of these mixtures.

A second aspect of the invention therefore provides a LCP mixture comprising a compound of formula (I) and one or more additional components. The LCP mixture may also include a suitable organic solvent.

The one or more additional components present in the LCP mixture may be further compounds of formula (I), other mesogenic compounds, compounds that are compatible with a mesogenic molecular architecture or chiral dopants for the induction of helical pitch. The LCP mixture may also include a suitable organic solvent.

Examples of solvents that may be used in the preparation of such liquid crystalline mixtures include but not limited to, acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), 1,3-dioxolane (DXG), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), propylene glycol monoacetate, propylene glycol diacetate, dipropylene glycol monomethyl ether, dimethyl sulfoxide (DMSO).

Most preferred are cyclopentanone (CP), cyclohexanone (CH), methyl isobutyl ketone (MIBK), methylethylketone (MEK), ethyl acetate (EA), 1-methoxy-2-propanol acetate (MPA), 1,3-dioxolane (DXG), dimethyl sulfoxide (DMSO).

Dichroic dyes refer to dyes in which the absorbance varies between a longer axis direction and a shorter axis direction of a molecule. Dichroic dyes preferably absorb visible light. Examples of dichroic dyes include azo dyes, acridine dyes, oxazine dyes, cyanine dyes, naphthalene dyes and anthraquinone dyes. These dichroic dyes can be used individually or in combination. The amount of dichroic dye used relative to 100 parts by mass of the liquid crystal mixture is 0.01 parts by mass to 40 parts by mass, and preferably 0.05 parts by mass to 15 parts by mass.

The compounds of the invention may also be used in the formation of a LCP layer by casting a LCP compound according to the first aspect of the invention or a LCP mixture according to the third aspect of the invention onto a substrate.

A third aspect of the invention therefore provides a method forming a LCP network, preferably LCP film, comprising forming a LCP layer comprising a compound of formula (I), or preferably a LCP mixture comprising a compound of formula (I), and polymerising the LCP layer.

The invention also includes, in a fourth aspect of the invention, a cross-linked LCP network comprising a compound of formula (I), or a LCP mixture, in a cross-linked form.

The LCP network, preferably LCP film, has preferably a birefringence in the range of 0.27 to 0.45 (±0.01-0.02), more preferably in the range of 0.28 to 0.40 (±0.01), most preferably in the range of 0.30 to 0.40 (±0.01) and especially most preferred in the range of 0.31 to 0.38 (±0.01). The birefringence (Δn) was obtained by measurement with an Ellipsometer from the determined retardation (here at 550 nm) and thickness values according to the formula (Δn=Retardation/Thickness). The thicknesses of the samples are measured by a contact stylus profilometer.

A fifth aspect of the invention provides the use of a compound of formula (I) in the preparation of an optical or an electro-optical device. The use, in the preparation of an optical or electro-optical device, of liquid crystalline mixtures a is also included in this aspect of the invention.

A sixth aspect of the invention provides an optical or an electro-optical device comprising a compound of formula (I) in a cross-linked state. An optical or electro-optical device comprising a LCP liquid crystalline mixture in a cross-linked state according to the third aspect of the invention is also included in this aspect of the invention.

The LCP mixture can be applied on a support. The support may be rigid or flexible and can have any form or shape. For example, it may be a body with complex surfaces. In principle it may consist of any material. Preferably, the support comprises plastic, glass or metal or is a silicon wafer. In case the support is flexible, it is preferred that the support is a plastic or metal foil. Preferably, the surface of the support is flat. For some applications the support may comprise topographical surface structures, such as microstructures like micro lenses or micro-prisms, or structures exhibiting abrupt changes of the shape, such as rectangular structures. Preferably, the support is transparent.

The support may be moving during the deposition of the LCP mixture. For example, a layer of the LCP mixture may be produced in a continuous roll to roll process by depositing the material composition onto a moving flexible foil, which is preferably plastic or metallic. The resulting film may then be wound on a roll together with the support foil or the film may be released from the support and is then wound as a free standing film, without the support.

The support may have additional layers, such as organic, dielectric or metallic layers. The layers can have different functions, for example an organic layer can be coated as a primer layer which increases compatibility of the materials to be coated with the support. Metallic layers may be used as electrodes, for example when used in electrooptical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a retarder film, a polarizer, such as a polarizing film or a sheet polarizer, a reflective polarizer, such as the commercially available Vikuity™ DBEF film.

The LCP mixture may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

A layer of a LCP mixture does not have to cover the full surface of a support. Rather than that, the layer may be applied in the form of a pattern, for example by printing, or may after deposition be treated to have the form of a pattern, for example by photo-lithographic methods.

Alignment of the LCP can be achieved by any known means for aligning liquid crystals. For example, the support may have an aligning surface, which shall mean that the surface has the capability to align liquid crystals. The support may already provide the alignment without further treatment. For example, if a plastic substrate is used as a support, it may provide alignment on the surface due to the manufacturing method, for example extrusion or stretching of the substrate. It is also possible to brush the support or imprint a directional microstructure to generate alignment capability. Alternatively, a thin layer of a material may be coated on the support which is especially designed regarding alignment performance. The layer may be further brushed or treated to have a directional microstructure on the surface, for example by imprinting. If the thin layer comprises a photo-orientable substance, alignment can be generated by exposure to aligning light.

The aligning surface of the substrate may exhibit a pattern of alignment directions in order to define an orientation pattern for the liquid crystals in the LCP layer. Preferably, an alignment layer comprising a photo-orientable substance is used for this purpose and the alignment pattern is generated by selective exposure to aligning light of different polarization planes.

In the present invention new compounds of formula I of the present invention have been found which have a high birefringence. Furthermore, the compounds of formula I can be aligned by aligning layers, and preferably with photoalignment materials at low energy, which gives access to less energy consuming and more economic processes.

In addition, it was surprisingly found that the compounds of formula I showed very good alignment quality without any crystallization.

Furthermore, the compounds of formula I can be aligned at low energy (<250 mJ). They show very good alignment quality without any crystallization.

The invention will now be described with reference to the following non-limiting examples. These examples are provided by way of illustration only. Variations on these examples falling within the scope of the invention will be apparent to a skilled person.

The invention will now be described with reference to the following non-limiting examples. These examples are provided by way of illustration only. Variations on these examples falling within the scope of the invention will be apparent to a skilled person.

EXAMPLES

Definitions Used in the Examples $^1$H NMR: $^1$H nuclear magnetic resonance spectroscopy
DMSO-d$_6$: dimethylsulfoxid deuterated
300 MHz: 300 MegaHertz
m: multiplet, d: doublet, dd: doublet doublet, t: triplet, s: singulet
DMF: dimethylformamide
HCl: hydrochloric acid
DBU: 2,3,4,6,7,8,9,10-Octahydropyrimidol[1,2-a]azepine
THF: tetrahydrofuran
Na$_2$SO$_4$: sodium sulfate
Pd(PPh$_3$)$_2$Cl$_2$: Bis(triphenylphosphine)palladium dichloride
DCC: N,N'-Dicyclohexylcarbodiimide
DMAP: 4-Dimethylaminopyridine
CH$_2$Cl$_2$: dichloromethane
THF: tetrahydrofuran
NMP: N-Methyl-2-pyrrolidon
CuI: Copper iodide
MgSO$_4$: magnesium sulfate In the following examples, the thermotropic phases are abbreviated as follow:

$T_{(Cr—N)}$: transition temperature from crystal phase to nematic phase $T_{(N—I)}$: transition temperature from nematic phase to isotropic phase Example 1: Preparation of 6-(4-iodophenoxy)-hexan-1-ol Compound 1

A mixture of 4-iodophenol (40.0 g, 0.182 mol) and potassium carbonate (32.6 g, 0.236 mol) in 600 ml of DMF is heated to 90° C. 6-chlorohexan-1-ol (37.2 g, 0.272 mol) in 120 ml of DMF and potassium iodide (3.0 g, 0.018 mol) are added dropwise. The mixture is then stirred at 90° C. for 12 h. Then, the solution is cooled down to room temperature and poured onto 2.5 L of ice water containing 1.3 equivalent of HCl. The precipitate is filtered off, washed two times with 2 L of water and dried under vacuum at 40° C. to give the title compound (56.67 g, 0.177 mol) as an off-white powder.

Example 2: Preparation of 6-[4-(2-trimethylsilyl-ethynyl])phenoxyl-hexan-1-ol Compound 2

6-(4-iodophenoxy)-hexan-1-ol (24.09 g, 0.075 mol), Pd(PPh$_3$)$_2$Cl$_2$ (2.64 g, 3.76 mmol), copper iodide (1.43 g, 7.52 mmol) and triphenylphosphine (1.97 g, 7.52 mmol) are suspended in 100 ml of triethylamine (100 ml). Trimethyl-silylacetylene (11.08 g, 0.113 mol) is added dropwise. The resulting mixture is then heated to 60° C. for 5 h before cooling it to 25° C. A filtration over Hyflo® is followed by evaporation of the solvents. The residue is dissolved in ethyl acetate and washed with acidic H$_2$O, brine and then dried over Na$_2$SO$_4$. The residue is purified by flash chromatography over silica gel using a 1:1 mixture of heptane/ethyl acetate to provide the title compound (19.53 g, 0.067 mol) as a brown oil.

Example 3: Preparation of 6-(4-ethynylphenoxy)-hexan-1-ol Compound 3

To a solution of 6-[4-(2-trimethylsilylethynyl)phenoxy]-hexan-1-ol (19.53 g, 0.067 mol) in 500 ml of methanol, potassium carbonate (19.13 g, 0.134 mol) is added. The reaction mixture is stirred at ambient temperature for 2 h. After evaporation of the solvent, 1 L of H$_2$O is added and the suspension is extracted with ethyl acetate. A purification by flash chromatography over silica gel using a 1:1 mixture of heptane/ethyl acetate provides the title compound (9.55 g, 0.044 mol) as a brown oil which crystalizes after some minutes.

Example 4: Preparation of methyl 2,5-dihydroxybenzoate Compound 4

To a solution of 2,5-dihydroxybenzoic acid (10.0 g, 0.065 mol) in 50 ml of methanol, 5 ml of concentrated sulfuric acid is added, leading to an increase of the temperature to 40° C. The mixture is refluxed for 24 h and allowed then to cool to 25° C. The solution is poured onto H$_2$O and extracted with ethyl acetate. The organic layers are dried over Na$_2$SO$_4$ and filtered off. The solution is concentrated under vacuum to give the title compound (10.7 g, 0.063 mol) as a white powder.

Example 5: Preparation of methyl 2,5-bis[(4-iodobenzoyl)oxy]benzoate Compound 5

Methyl 2,5-dihydroxybenzoate (8.4 g, 0.05 mol), 4-iodobenzoic acid (24.8 g, 0.1 mol) and DMAP (1.22 g, 0.01 mol) are suspended in 450 ml of dichloromethane. DCC (25.8 g, 0.125 mol) dissolved in 80 ml of dichloromethane is added dropwise. After complete addition, the suspension is stirred at 25° C. for 3 h. The suspension is then filtered off over Hyflo®, which is washed with 250 ml of dichloromethane. The solution is concentrated under vacuum and a purification by recrystallization in 250 ml of methanol gives the title compound (21.55 g, 0.034 mol) as a white powder.

Example 6: Preparation of methyl 5-[4-[2-[4-(6-hydroxyhexoxy)phenyl]ethynyl]-benzoyl]oxy-2-(4-iodobenzoyl)oxy-benzoate Compound 6

Under N$_2$ atmosphere, 6-(4-ethynylphenoxy)-hexan-1-ol (4.17 g, 0.019 mol), methyl 2,5-bis[(4-iodobenzoyl)oxy] benzoate (12.0 g, 0.019 mol), Pd(PPh$_3$)$_2$Cl$_2$ (0.67 g, 0.95 mmol), copper iodide (0.36 g, 1.9 mmol) and triphenylphosphine (0.5 g, 1.9 mmol) are suspended in 200 ml of triethylamine. The mixture is stirred at 40° C. for 5 h. After cooling down to 25° C., 6-(4-ethynylphenoxy)-hexan-1-ol (0.83 g, 0.004 mol) is added. After stirring 24 h, the reaction mixture is poured onto 500 ml of H$_2$O and acidified with HCl to pH 1. The precipitate is filtered off and the residue dissolved with 1 L of ethyl acetate. The solution is passed through Hyflo® and then concentrated under vacuum. A purification by flash chromatography over silica gel using a 1:2 mixture of heptane/ethyl acetate results in the title compound (3.5 g, 0.005 mol) as a dark orange solid.

Example 7: Preparation of methyl 2-(4-iodobenzoyl)oxy-5-[4-[2-[4-(6-prop-2-enoyloxyhexoxy) phenyl]ethynyl]benzoyl]oxy-benzoate Compound 7

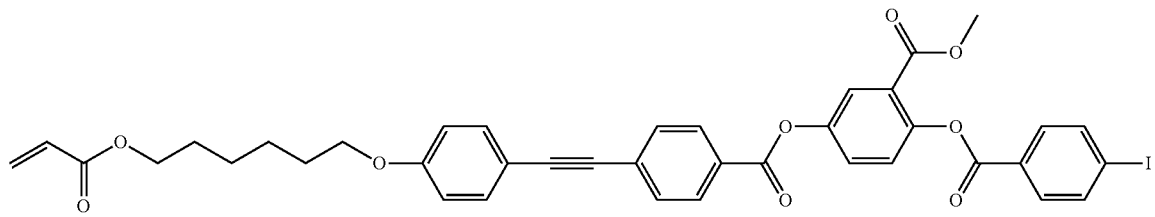 [SMILES: C=CC(=O)OCCCCCCOc1ccc(C#Cc2ccc(C(=O)Oc3ccc(OC(=O)c4ccc(I)cc4)c(C(=O)OC)c3)cc2)cc1]

To a solution of methyl 5-[4-[2-[4-(6-hydroxyhexoxy) phenyl]ethynyl]benzoyl]oxy-2-(4-iodobenzoyl)oxy-benzoate (3.5 g, 0.005 mol) in 150 ml of tetrahydrofuran cooled to 0° C., triethylamine (1.47 g, 0.014 mol) is added. 2-Propenoyl chloride (2.2 g, 0.024 mol) is added dropwise to the reaction mixture followed by DMAP (0.122 g, 0.97 mmol). After stirring 4 h at 0-5° C., the mixture is allowed to warm to 25° C. The solution is then diluted with acetonitrile and a purification by flash chromatography over silica gel using ethyl acetate affords a brown residue. The former oil is suspended in acetonitrile. The obtained precipitate is filtered off and dried under vacuo to result in the title compound (1.12 g, 1.45 mmol) as a grey solid.

Liquid crystal phase Transition: Compound 7 is observed with a polarizing microscope under cross polarizers to determine its phase transition temperature. As a result, when the temperature increases, the crystalline phase changes into nematic phase at 82° C. ($T_{(Cr-N)}$) and the isotropic phase appears to be above 184° C. ($T_{(N-I)}$).

$^1$H NMR (300 MHz) in DMSO-$d_6$: 8.16 (m, 2H), 8.03 (m, 2H), 7.90 (m, 3H), 7.74 (m, 3H), 7.55 (m, 3H), 7.01 (m, 3H), 6.32 (m, 1H), 6.17 (m, 1H), 5.93 (m, 1H), 4.12 (t, 2H), 4.02 (t, 2H), 3.69 (s, 3H), 1.74 (m, 2H), 1.64 (m, 2H), 1.42 (m, 4H).

Example 8: Preparation of methyl 2,5-bis[[4-[2-[4-(6-hydroxyhexoxy)phenyl]ethynyl]-benzoyl]oxy]benzoate Compound 8

Under N$_2$ atmosphere, 6-(4-ethynylphenoxy)-hexan-1-ol (17.46 g, 0.08 mol), methyl 2,5-bis[(4-iodobenzoyl)oxy]benzoate (25.13 g, 0.04 mol), Pd(PPh$_3$)$_2$Cl$_2$ (2.81 g, 0.004 mol), copper iodide (1.52 g, 0.008 mol) and triphenylphosphine (2.1 g, 0.008 mol) are suspended in 500 ml of triethylamine. The reaction mixture is stirred at 60° C. for 12 h and then cooled to room temperature. The obtained precipitate is filtered off and purified by flash chromatography over silica gel using a 1:2 mixture of heptane/ethyl acetate to give the title compound (10.41 g, 0.013 mol) as a yellow solid.

Example 9: Preparation of methyl 2,5-bis[[4-[2-[4-(6-prop-2-enoyloxyhexoxy)phenyl]-ethynyl]benzoyl]oxy]benzoate Compound 9

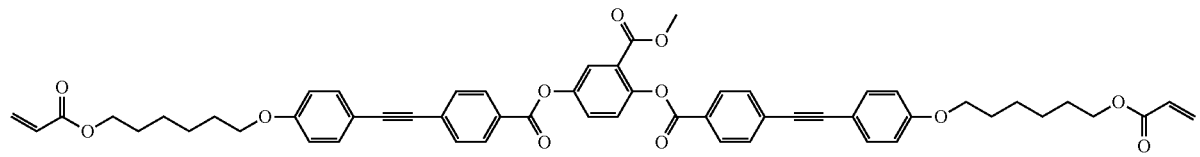 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c(C(=O)OC)c3)cc2)cc1]

Methyl 2,5-bis[[4-[2-[4-(6-hydroxyhexoxy)phenyl]ethynyl]benzoyl]oxy]benzoate (10.0 g, 0.012 mol) is suspended in 400 ml of tetrahydrofuran and triethylamine (5.15 g, 0.051 mol) is added. The mixture is cooled down to 0° C. and then 2-propenoyl chloride (6.9 g, 0.076 mol) is added dropwise followed by DMAP (0.311 g, 2.5 mmol). The reaction mixture is stirred at 0-5° C. for 5 h. The suspension is then filtered off and the resulting organic solution is concentrated under vacuum to give a yellow oil. The former residue is suspended in ethyl acetate and cooled to 5° C. for 20 h. The precipitate is filtered off and a purification by flash chromatography over silica gel using ethyl acetate provides the title compound (0.72 g, 0.78 mmol) as a yellow solid.

Liquid crystal phase Transition: Compound 9 is observed with a polarizing microscope under cross polarizers to determine its phase transition temperature. As a result, when the temperature increases, the crystalline phase changes into nematic phase at 76° C. ($T_{(Cr-N)}$) and the isotropic phase appears to be above 200° C. ($T_{(N-I)}$).

$^1$H NMR (300 MHz) in DMSO-$d_6$: 8.17 (m, 4H), 7.95 (d, 1H), 7.74 (m, 5H), 7.56 (m, 5H), 7.01 (m, 4H), 6.32 (m, 2H), 6.17 (m, 2H), 5.93 (m, 2H), 4.12 (t, 4H), 4.02 (m, 4H), 3.71 (s, 3H), 1.74 (m, 4H), 1.62 (m, 4H), 1.41 (m, 8H).

Example 10: Preparation of 3-(4-iodophenoxy)-propan-1-ol Compound 10

The title compound 10 is prepared according to the process described in example 1 for compound 1 with the proviso that 6-chlorohexanol is replaced by 3-chloropropanol.

Example 11: Preparation of 3-(4-bromophenyl-sulfanylpropan-1-ol Compound 11

The title compound 11 is prepared according to the process described in example 1 for compound 1 with the proviso that 6-chlorohexanol and 4-iodophenol are respectively replaced by 3-chloropropanol and 4-bromobenzenethiol.

Example 12: Preparation of 6-(4-bromophenyl)-sulfanylhexan-1-ol Compound 12

The title compound 12 is prepared according to the process described in example 1 for compound 1 with the proviso that 4-iodophenol is replaced by 4-bromobenzenethiol.

Example 13: Preparation of 6-[(6-bromo-2-naphthyl)oxy]-hexan-1-ol Compound 13

The title compound 13 is prepared according to the process described in example 1 for compound 1 with the proviso that 4-iodophenol is replaced by 6-bromonaphthalen-2-ol.

Example 14: Preparation of 3-[(6-bromo-2-naphthyl)oxy]-propan-1-ol, Compound 14

The title compound 14 is prepared according to the process described in example 1 for compound 1 with the proviso that 6-chlorohexanol is replaced by 3-chloropropanol and 4-iodophenol is replaced by 6-bromonaphthalen-2-ol.

Example 15: Preparation of 3-[4-(2-trimethylsilylethynyl)phenoxy]-propan-1-ol Compound 15

The title compound 15 is prepared according to the process described in example 2 for compound 2 with the proviso that 6-(4-iodophenoxy)-hexan-1-ol is replaced by 3-(4-iodophenoxy)-propan-1-ol compound 10.

Example 16: Preparation of 3-[4-(2-trimethylsilylethynyl)phenyl]-sulfanylpropan-1-ol Compound 16

The title compound 16 is prepared according to the process described in example 2 for compound 2 with the proviso that 6-(4-iodophenoxy)-hexan-1-ol is replaced by 3-(4-bromophenyl)-sulfanylpropan-1-ol compound 11.

Example 17: Preparation of 6-[4-(2-trimethylsilyl-ethynyl)phenyl]-sulfanylhexan-1-ol Compound 17

The title compound 17 is prepared according to the process described in example 2 for compound 2 with the proviso that 6-(4-iodophenoxy)-hexan-1-ol is replaced by 6-(4-bromophenyl)-sulfanylhexan-1-ol compound 12.

Example 18: Preparation of 6-[(6-(2-trimethylsilyl-ethynyl)-2-naphthyl)oxy]-hexan-1-ol Compound 18

The title compound 18 is prepared according to the process described in example 2 for compound 2 with the proviso that 6-(4-iodophenoxy)-hexan-1-ol is replaced by 6-[(6-bromo-2-naphthyl)oxy]-hexan-1-ol compound 13.

Example 19: Preparation of 3-[(6-(2-trimethylsilyl-ethynyl)-2-naphthyl)oxy]-propan-1-ol Compound 19

The title compound 19 is prepared according to the process described in example 2 for compound 2 with the proviso that 6-(4-iodophenoxy)-hexan-1-ol is replaced by 3-[(6-bromo-2-naphthyl)oxy]-propan-1-ol compound 14.

Example 20: Preparation of 3-(4-ethynylphenoxy)-propan-1-ol Compound 20

The title compound 20 is prepared according to the process described in example 3 for compound 3 with the proviso that 6-[4-(2-trimethylsilylethynyl)phenoxy]-hexan-1-ol is replaced by 3-[4-(2-trimethylsilylethynyl)phenoxy]-propan-1-ol compound 15.

Example 21: Preparation of 3-(4-ethynylphenyl)-sulfanylpropan-1-ol, Compound 21

The title compound 21 is prepared according to the process described in example 3 for compound 3 with the proviso that 6-[4-(2-trimethylsilylethynyl)phenoxy]-hexan-1-ol is replaced by 3-[4-(2-trimethylsilylethynyl)phenyl]-sulfanylpropan-1-ol compound 16.

Example 22: Preparation of 6-(4-ethynylphenyl)-sulfanylhexan-1-ol, Compound 22

The title compound 22 is prepared according to the process described in example 3 for compound 3 with the proviso that 6-[4-(2-trimethylsilylethynyl)phenoxy]-hexan-1-ol is replaced by 6-[4-(2-trimethylsilylethynyl)phenyl]-sulfanylhexan-1-ol compound 17.

Example 23: Preparation of 6-[(6-ethynyl-2-naphthyl)oxy]-hexan-1-ol, Compound 23

The title compound 23 is prepared according to the process described in example 3 for compound 3 with the proviso that 6-[4-(2-trimethylsilylethynyl)phenoxy]-hexan-1-ol is replaced by 6-[(6-(2-trimethylsilylethynyl)-2-naphthyl)oxy]-hexan-1-ol compound 18.

Example 24: Preparation of 3-[(6-ethynyl-2-naphthyl)oxy]-propan-1-ol, Compound 24

The title compound 24 is prepared according to the process described in example 3 for compound 3 with the proviso that 6-[4-(2-trimethylsilylethynyl)phenoxy]-hexan-1-ol is replaced by 3-[(6-(2-trimethylsilylethynyl)-2-naphthyl)oxy]-propan-1-ol compound 19.

Example 25: Preparation of ethyl 2,5-dihydroxybenzoate, Compound 25

The title compound 25 is prepared according to the process described in example 4 for compound 4 with the proviso that methanol is replaced by ethanol.

Example 26: Preparation of buthyl 2,5-dihydroxybenzoate, Compound 26

The title compound 26 is prepared according to the process described in example 4 for compound 4 with the proviso that methanol is replaced by butanol.

Example 27: Preparation of 2-(1,3-benzothiazol-2-yl)benzene-1,4-diol, Compound 27

To a suspension of 2-aminobenzenethiol (24.0 g, 0.192 mol) in 1.5 L of $H_2O$, 2,5-dihydroxybenzaldehyde (26.52 g, 0.192 mol) is added dropwise. The reaction mixture is heated to 110° C. for 8 h. After cooling down to 25° C., the obtained precipitate is filtered off and purified by flash chromatography over silica gel using a 1:1 mixture of heptane/ethyl acetate to give the title compound (13.97 g, 0.057 mol) as a yellow solid.

Example 28: Preparation of 4-[4-(11-hydroxyundecoxy)phenyl]-benzonitrile, Compound 28

The title compound 28 is prepared according to the process described in example 1 for compound 1 with the proviso that 6-chlorohexanol and 4-iodophenol are respectively replaced by 11-bromoundecanol and by 4-(4-hydroxyphenyl)benzonitrile.

Example 29: Preparation of 4-[4-(10-hydroxydecoxy)phenyl]-benzonitrile, Compound 29

The title compound 29 is prepared according to the process described in example 1 for compound 1 with the proviso that 6-chlorohexanol and 4-iodophenol are respectively replaced by 10-bromodecanol and by 4-(4-hydroxyphenyl)benzonitrile.

Example 30: Preparation of 4-[4-(8-hydroxyoctoxy)phenyl]-benzonitrile, Compound 30

The title compound 30 is prepared according to the process described in example 1 for compound 1 with the proviso that 6-chlorohexanol and 4-iodophenol are respectively replaced by 8-bromooctanol and by 4-(4-hydroxyphenyl)benzonitrile.

Example 31: Preparation of 11-[4-(4-cyanophenyl)phenoxy]undecyl methanesulfonate Compound 31

To a suspension of 4-[4-(11-hydroxyundecoxy)phenyl]-benzonitrile (60.6 g, 0.165 mol) in 500 ml of THF, triethylamine (50.6 g, 0.495 mol) is added dropwise. The reaction is cooled down to 0° C. Methanesulfonylchloride (22.8 g, 0.198 mol) is slowly added and the mixture is stirred at 0-5°

C. for 2 h. After filtration over Hyflo®, the solvent is evaporated under vacuum to provide the title compound (72.0 g, 0.162 mol) as an off-white solid.

Example 32: Preparation of 10-[4-(4-cyanophenyl)phenoxy]decyl methanesulfonate Compound 32

The title compound 32 is prepared according to the process described in example 31 for compound 31 with the proviso that 4-[4-(11-hydroxyundecoxy)phenyl]-benzonitrile is replaced by 4-[4-(10-hydroxydecoxy)phenyl]-benzonitrile compound 29.

Example 33: Preparation of 8-[4-(4-cyanophenyl)phenoxy]octyl methanesulfonate Compound 33

The title compound 33 is prepared according to the process described in example 31 for compound 31 with the proviso that 4-[4-(11-hydroxyundecoxy)phenyl]-benzonitrile is replaced by 4-[4-(8-hydroxyoctoxy)phenyl]-benzonitrile compound 30.

Example 34: Preparation of 11-[4-(4-cyanophenyl)phenoxy]undecyl 2,5-dihydroxybenzoate, Compound 34

To a solution of 2,5-dihydroxybenzoic acid (27.2 g, 0.173 mol) in 180 ml of DMF, DBU (26.4 g, 0.170 mol) is dropwise added. The solution is stirred 0.5 h at room temperature. Afterwards, sodium iodide (7.45 g, 0.050 mol) and a solution of 11-[4-(4-cyanophenyl)phenoxy]undecyl methanesulfonate (72.0 g, 0.162 mol) in 180 ml of DMF are slowly added. The resulting reaction mixture is heated to 70° C. for 16 h. After filtration over Hyflo®, the filtrate is added to 2 L of ice water. The obtained precipitate is filtered off and purified by recrystallization in 600 ml of acetonitrile to give the title compound (61.8 g, 0.123 mol) as a white powder.

Example 35: Preparation of 10-[4-(4-cyanophenyl)phenoxy]decyl 2,5-dihydroxybenzoate, Compound 35

The title compound 35 is prepared according to the process described in example 34 for compound 34 with the proviso that 11-[4-(4-cyanophenyl)phenoxy]undecyl methanesulfonate is replaced by 10-[4-(4-cyanophenyl)phenoxy]decyl methanesulfonate compound 32.

Example 36: Preparation of 8-[4-(4-cyanophenyl)phenoxy]octyl 2,5-dihydroxybenzoate Compound 36

The title compound 35 is prepared according to the process described in example 34 for compound 34 with the proviso that 11-[4-(4-cyanophenyl)phenoxy]undecyl methanesulfonate is replaced by 8-[4-(4-cyanophenyl)phenoxy]oct methanesulfonate compound 33.

Example 37: Preparation of ethyl 2,5-bis[(4-iodobenzoyl)oxy]benzoate, Compound 37

The title compound 37 is prepared according to the process described in example 5 for compound 5 with the proviso that methyl 2,5-dihydroxybenzoate is replaced by ethyl 2,5-dihydroxybenzoate compound 25.

Example 38: Preparation of butyl 2,5-bis[(4-iodobenzoyl)oxy]benzoate, Compound 38

The title compound 38 is prepared according to the process described in example 5 for compound 5 with the proviso that methyl 2,5-dihydroxybenzoate is replaced by butyl 2,5-dihydroxybenzoate compound 26.

Example 39: Preparation of [3-(1,3-benzothiazol-2-yl)-4-(4-iodobenzoyl)oxy-phenyl]4-iodobenzoate, Compound 39

The title compound 39 is prepared according to the process described in example 5 for compound 5 with the proviso that methyl 2,5-dihydroxybenzoate is replaced by 2-(1,3-benzothiazol-2-yl)benzene-1,4-diol compound 27.

Example 40: Preparation of [4-(4-iodobenzoyl)oxy-1-naphthyl]4-iodobenzoate Compound 40

The title compound 40 is prepared according to the process described in example 5 for compound 5 with the proviso that methyl 2,5-dihydroxybenzoate is replaced by naphthalene-1,4-diol.

Example 41: Preparation of 11-[4-(4-cyanophenyl)phenoxy]undecyl 2,5-bis[(4-iodobenzoyl)oxy]benzoate, Compound 41

The title compound 41 is prepared according to the process described in example 5 for compound 5 with the proviso that methyl 2,5-dihydroxybenzoate is replaced by 11-[4-(4-cyanophenyl)phenoxy]undecyl 2,5-dihydroxybenzoate compound 34.

Example 42: Preparation of 10-[4-(4-cyanophenyl)phenoxy]decyl 2,5-bis[(4-iodobenzoyl)oxy]benzoate, Compound 42

The title compound 42 is prepared according to the process described in example 5 for compound 5 with the proviso that methyl 2,5-dihydroxybenzoate is replaced by 10-[4-(4-cyanophenyl)phenoxy]decyl 2,5-dihydroxybenzoate compound 35.

Example 43: Preparation of 8-[4-(4-cyanophenyl)phenoxy]octyl 2,5-bis[(4-iodobenzoyl)oxy]benzoate, Compound 43

The title compound 43 is prepared according to the process described in example 5 for compound 5 with the proviso that methyl 2,5-dihydroxybenzoate is replaced by 8-[4-(4-cyanophenyl)phenoxy]octyl 2,5-dihydroxybenzoate compound 36.

Example 44: Preparation of ethyl 2-[4-[2-[4-(6-hydroxyhexoxy)phenyl]ethynyl]-benzoyl]oxy-5-(4-iodobenzoyl)oxy-benzoate, Compound 44

The title compound 44 is prepared according to the process described in example 6 for compound 6 with the proviso that methyl 2,5-bis[(4-iodobenzoyl)oxy]benzoate is replaced by ethyl 2,5-bis[(4-iodobenzoyl)oxy]benzoate compound 37.

Example 45: Preparation of ethyl 2,5-bis[[4-[2-[4-(6-hydroxyhexoxy)phenyl]ethynyl]-benzoyl]oxy]benzoate, Compound 45

The title compound 45 is prepared according to the process described in example 8 for compound 8 with the proviso that methyl 2,5-bis[(4-iodobenzoyl)oxy]benzoate is replaced by ethyl 2,5-bis[(4-iodobenzoyl)oxy]benzoate compound 37.

Example 46: Preparation of butyl 2-[4-[2-[4-(6-hydroxyhexoxy)phenyl]ethynyl]-benzoyl]oxy-5-(4-iodobenzoyl)oxy-benzoate, Compound 46

The title compound 46 is prepared according to the process described in example 6 for compound 6 with the proviso that methyl 2,5-bis[(4-iodobenzoyl)oxy]benzoate is replaced by butyl 2,5-bis[(4-iodobenzoyl)oxy]benzoate compound 38.

Example 47: Preparation of butyl 2,5-bis[[4-[2-[4-(6-hydroxyhexoxy)phenyl]ethynyl]-benzoyl]oxy]benzoate, Compound 47

The title compound 47 is prepared according to the process described in example 8 for compound 8 with the proviso that methyl 2,5-bis[(4-iodobenzoyl)oxy]benzoate is replaced by butyl 2,5-bis[(4-iodobenzoyl)oxy]benzoate compound 38.

Example 48: Preparation of butyl 2-[4-[2-[4-(3-hydroxypropoxy)phenyl]ethynyl]-benzoyl]oxy-5-(4-iodobenzoyl)oxy-benzoate, Compound 48

The title compound 48 is prepared according to the process described in example 6 for compound 6 with the proviso that 6-(4-ethynylphenoxy)-hexan-1-ol is replaced by 3-(4-ethynylphenoxy)-propan-1-ol compound 20 and methyl 2,5-bis[(4-iodobenzoyl)oxy]benzoate is replaced by butyl 2,5-bis[(4-iodobenzoyl)oxy]benzoate compound 38.

Example 49: Preparation of butyl 2,5-bis[[4-[2-[4-(3-hydroxypropoxy)phenyl]ethynyl]-benzoyl]oxy]benzoate, Compound 49

The title compound 49 is prepared according to the process described in example 8 for compound 8 with the proviso that 6-(4-ethynylphenoxy)-hexan-1-ol is replaced by 3-(4-ethynylphenoxy)-propan-1-ol compound 20 and methyl 2,5-bis[(4-iodobenzoyl)oxy]benzoate is replaced by butyl 2,5-bis[(4-iodobenzoyl)oxy]benzoate compound 38.

Example 50: Preparation of methyl 2,5-bis[[4-[2-[6-(6-hydroxyhexoxy)-2-naphthyl]-ethynyl]benzoyl]oxy]benzoate, Compound 50

The title compound 50 is prepared according to the process described in example 8 for compound 8 with the proviso that 6-(4-ethynylphenoxy)-hexan-1-ol is replaced by 6-[(6-ethynyl-2-naphthyl)oxy]-hexan-1-ol compound 23.

Example 51: Preparation of butyl 2,5-bis[[4-[2-[6-(6-hydroxyhexoxy)-2-naphthyl]-ethynyl]benzoyl]oxy]benzoate, Compound 51

The title compound 51 is prepared according to the process described in example 8 for compound 8 with the proviso that 6-(4-ethynylphenoxy)-hexan-1-ol is replaced by 6-[(6-ethynyl-2-naphthyl)oxy]-hexan-1-ol compound 23 and methyl 2,5-bis[(4-iodobenzoyl)oxy]benzoate is replaced by butyl 2,5-bis[(4-iodobenzoyl)oxy]benzoate compound 38.

Example 52: Preparation of methyl 2,5-bis[[4-[2-[4-(6-hydroxyhexylsulfanyl)phenyl]-ethynyl]benzoyl]oxy]benzoate, Compound 52

The title compound 52 is prepared according to the process described in example 8 for compound 8 with the proviso that 6-(4-ethynylphenoxy)-hexan-1-ol is replaced by 6-(4-ethynylphenyl)-sulfanylhexan-1-ol compound 22.

Example 53: Preparation of butyl 2,5-bis[[4-[2-[4-(3-hydroxypropylsulfanyl)phenyl]-ethynyl]benzoyl]oxy]benzoate, Compound 53

The title compound 53 is prepared according to the process described in example 8 for compound 8 with the proviso that 6-(4-ethynylphenoxy)-hexan-1-ol is replaced by 3-(4-ethynylphenyl)-sulfanylpropan-1-ol compound 21 and methyl 2,5-bis[(4-iodobenzoyl)oxy]benzoate is replaced by butyl 2,5-bis[(4-iodobenzoyl)oxy]benzoate compound 38.

Example 54: Preparation of [3-(1,3-benzothiazol-2-yl)-4-[2-[4-(6-hydroxyhexoxy)-phenyl]ethynyl]benzoyl]oxy-phenyl]-4-[2-[4-(6-hydroxyhexoxy)phenyl]ethynyl]-benzoate, compound 54

The title compound 54 is prepared according to the process described in example 8 for compound 8 with the proviso that methyl 2,5-bis[(4-iodobenzoyl)oxy]benzoate is replaced by [3-(1,3-benzothiazol-2-yl)-4-(4-iodobenzoyl)oxy-phenyl]4-iodobenzoate compound 39.

Example 55: Preparation of [4-[4-[2-[4-(6-hydroxyhexoxy)phenyl]ethynyl]benzoyl]oxy-1-naphthyl]4-[2-[4-(6-hydroxyhexoxy)phenyl]ethynyl]benzoate, Compound 55

The title compound 55 is prepared according to the process described in example 8 for compound 8 with the proviso that methyl 2,5-bis[(4-iodobenzoyl)oxy]benzoate is replaced by [4-(4-iodobenzoyl)oxy-1-naphthyl]4-iodobenzoate compound 40.

Example 56: Preparation of 11-[4-(4-cyanophenyl)phenoxy]undecyl 2,5-bis[[4-[2-[4-(6-hydroxyhexoxy)phenyl]ethynyl]benzoyl]oxy]benzoate, Compound 56

The title compound 56 is prepared according to the process described in example 8 for compound 8 with the proviso that methyl 2,5-bis[(4-iodobenzoyl)oxy]benzoate is replaced by 11-[4-(4-cyanophenyl)phenoxy]undecyl 2,5-bis[(4-iodobenzoyl)oxy]benzoate compound 41.

Example 57: Preparation of 10-[4-(4-cyanophenyl)phenoxy]decyl 2,5-bis[[4-[2-[4-(6-hydroxyhexoxy)phenyl]ethynyl]benzoyl]oxy]benzoate, Compound 57

The title compound 57 is prepared according to the process described in example 8 for compound 8 with the proviso that methyl 2,5-bis[(4-iodobenzoyl)oxy]benzoate is replaced by 10-[4-(4-cyanophenyl)phenoxy]decyl 2,5-bis[(4-iodobenzoyl)oxy]benzoate compound 42.

Example 58: Preparation of 8-[4-(4-cyanophenyl)phenoxy]octyl 2,5-bis[[4-[2-[4-(6-hydroxyhexoxy)phenyl]ethynyl]benzoyl]oxy]benzoate, Compound 58

The title compound 58 is prepared according to the process described in example 8 for compound 8 with the proviso that methyl 2,5-bis[(4-iodobenzoyl)oxy]benzoate is replaced by 8-[4-(4-cyanophenyl)phenoxy]octyl 2,5-bis[(4-iodobenzoyl)oxy]benzoate compound 43.

Example 59: Preparation of 10-[4-(4-cyanophenyl)phenoxy]decyl 2,5-bis[[4-[2-[4-(3-hydroxypropoxy)phenyl]ethynyl]benzoyl]oxy]benzoate, Compound 59

The title compound 59 is prepared according to the process described in example 8 for compound 8 with the proviso that 6-(4-ethynylphenoxy)-hexan-1-ol is replaced by 3-(4-ethynylphenoxy)-propan-1-ol compound 20 and methyl 2,5-bis[(4-iodobenzoyl)oxy]benzoate is replaced by 10-[4-(4-cyanophenyl)phenoxy]decyl 2,5-bis[(4-iodobenzoyl)oxy]benzoate compound 42.

Example 60: Preparation of ethyl 5-(4-iodobenzoyl)oxy-2-[4-[2-[4-(6-prop-2-enoyloxyhexoxy)phenyl]ethynyl]benzoyl]oxy-benzoate, Compound 60

The title compound 60 is prepared according to the process described in example 7 for compound 7 with the proviso that 5-[4-[2-[4-(6-hydroxyhexoxy)phenyl]ethynyl]benzoyl]oxy-2-(4-iodobenzoyl)oxy-benzoate is replaced by ethyl 2-[4-[2-[4-(6-hydroxyhexoxy)phenyl]-ethynyl]-benzoyl]oxy-5-(4-iodobenzoyl)oxy-benzoate compound 44.

Example 61: Preparation of ethyl 2,5-bis[[4-[2-[4-(6-prop-2-enoyloxyhexoxy)phenyl]-ethynyl]benzoyl]oxy]benzoate, Compound 61

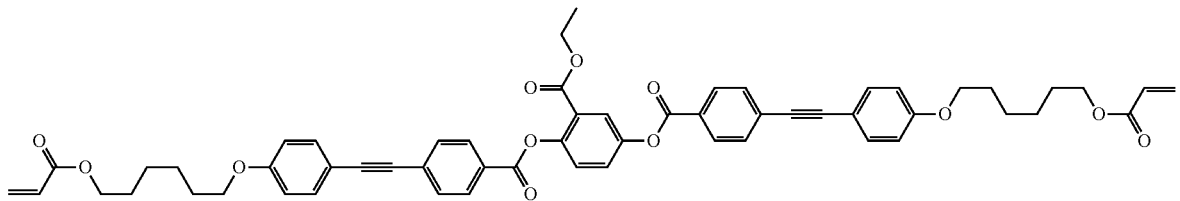 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c(C(=O)OCC)c3)cc2)cc1]

The title compound 61 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by ethyl 2,5-bis[[4-[2-[4-(6-hydroxyhexoxy)phenyl]ethynyl]-benzoyl]oxy]benzoate compound 45. Purification by flash chromatography over silica gel using ethyl acetate provides the title compound (3.18 g, 3.41 mmol, 47%) as an off-white solid.

Liquid crystal phase Transition: Compound 61 is observed with a polarizing microscope under cross polarizers to determine its phase transition temperature. As a result, when the temperature increases, the crystalline phase changes into nematic phase at 70° C. ($T_{(Cr-N)}$) and the isotropic phase appears to be above 200° C. ($T_{(N-I)}$).

$^1$H NMR (300 MHz) in DMSO-$d_6$: 8.18 (m, 4H), 7.95 (d, 1H), 7.74 (m, 5H), 7.55 (m, 5H), 7.01 (m, 4H), 6.32 (m, 2H), 6.17 (m, 2H), 5.93 (m, 2H), 4.12 (m, 6H), 4.02 (m, 4H), 1.74 (m, 4H), 1.65 (m, 4H), 1.42 (m, 8H), 1.04 (t, 3H).

Example 62: Preparation of butyl 5-(4-iodobenzoyl)oxy-2-[4-[2-[4-(6-prop-2-enoyloxyhexoxy)phenyl]ethynyl]benzoyl]oxy-benzoate, Compound 62

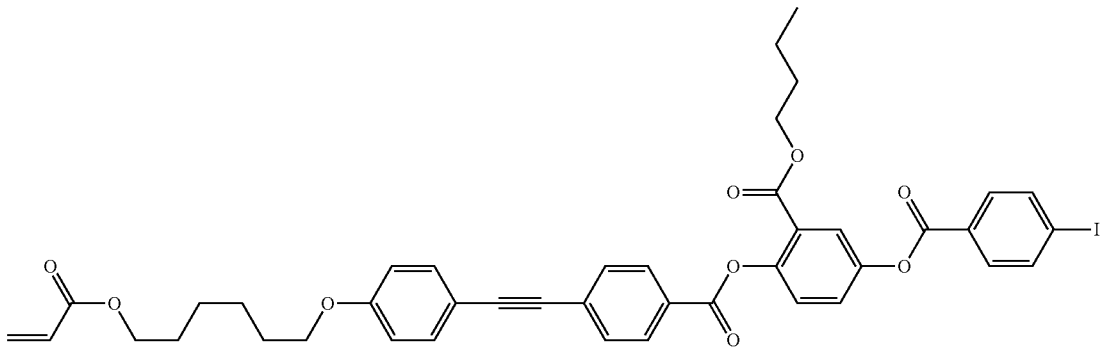 [SMILES: C=CC(=O)OCCCCCCOc1ccc(C#Cc2ccc(C(=O)Oc3ccc(OC(=O)c4ccc(I)cc4)cc3C(=O)OCCCC)cc2)cc1]

The title compound 62 is prepared according to the process described in example 7 for compound 7 with the proviso that 5-[4-[2-[4-(6-hydroxyhexoxy)phenyl]ethynyl]benzoyl]oxy-2-(4-iodobenzoyl)oxy-benzoate is replaced by butyl 2-[4-[2-[4-(6-hydroxyhexoxy)phenyl]-ethynyl]-benzoyl]oxy-5-(4-iodobenzoyl)oxy-benzoate compound 46. A purification by flash chromatography over silica gel using ethyl acetate affords a brown oily residue which is suspended in acetonitrile. The obtained precipitate is filtered off and dried under vacuo to result in the title compound (1.53 g, 1.87 mmol, 94%) as a grey solid.

Liquid crystal phase Transition: Compound 62 was observed with a polarizing microscope under cross polarizers to determine its phase transition temperature. As a result, when the temperature increased, the crystalline phase changed into nematic phase at 80° C. ($T_{(Cr-N)}$) and the isotropic phase appeared to be above 140° C. ($T_{(N-I)}$).

$^1$H NMR (300 MHz) in DMSO-$d_6$: 8.16 (m, 2H), 8.03 (m, 2H), 7.90 (m, 3H), 7.75 (m, 2H), 7.70 (m, 1H), 7.54 (m, 3H), 7.01 (m, 2H), 6.32 (m, 1H), 6.17 (m, 1H), 5.93 (m, 1H), 4.12 (m, 4H), 4.01 (t, 2H), 1.74 (m, 2H), 1.68 (m, 2H), 1.45 (m, 6H), 1.18 (m, 2H), 0.73 (t, 3H).

Example 63: Preparation of butyl 2,5-bis[[4-[2-[4-(6-prop-2-enoyloxyhexoxy)phenyl]-ethynyl]benzoyl]oxy]benzoate Compound 63

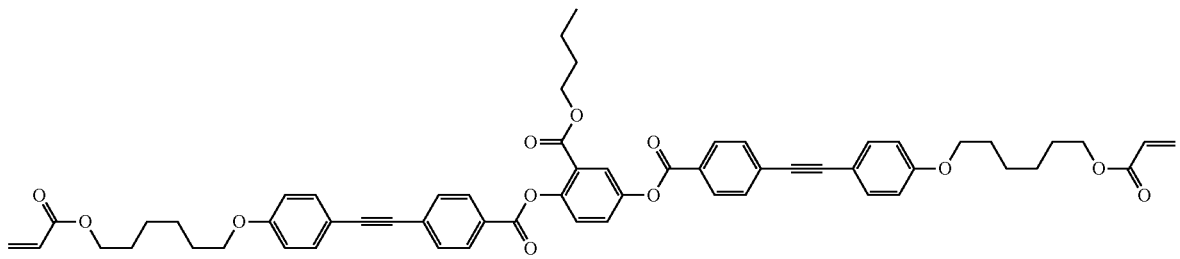 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c(C(=O)OCCCC)c3)cc2)cc1]

The title compound 63 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by butyl 2,5-bis[[4-[2-[4-(6-hydroxyhexoxy)phenyl]ethynyl]-benzoyl]oxy]benzoate compound 47. A purification by flash chromatography over silica gel using ethyl acetate provides the title compound (0.64 g, 0.67 mmol, 57%) as a white solid.

Liquid crystal phase Transition: Compound 63 is observed with a polarizing microscope under cross polarizers to determine its phase transition temperature. As a result, when the temperature increases, the crystalline phase changes into nematic phase at 117° C. ($T_{(Cr-N)}$) and the isotropic phase appears to be above 200° C. ($T_{(N-I)}$).

$^1$H NMR (300 MHz) in DMSO-$d_6$: 8.17 (m, 4H), 7.93 (d, 1H), 7.74 (m, 5H), 7.56 (m, 5H), 7.01 (m, 4H), 6.32 (m, 2H), 6.17 (m, 2H), 5.93 (m, 2H), 4.12 (m, 6H), 4.02 (m, 4H), 1.74 (m, 4H), 1.64 (m, 4H), 1.41 (m, 10H), 1.22 (m, 2H), 0.73 (t, 3H).

Example 64: Preparation of butyl 5-(4-iodobenzoyl)oxy-2-[4-[2-[4-(3-prop-2-enoyloxypropoxy)phenyl]ethynyl]benzoyl]oxy-benzoate, Compound 64

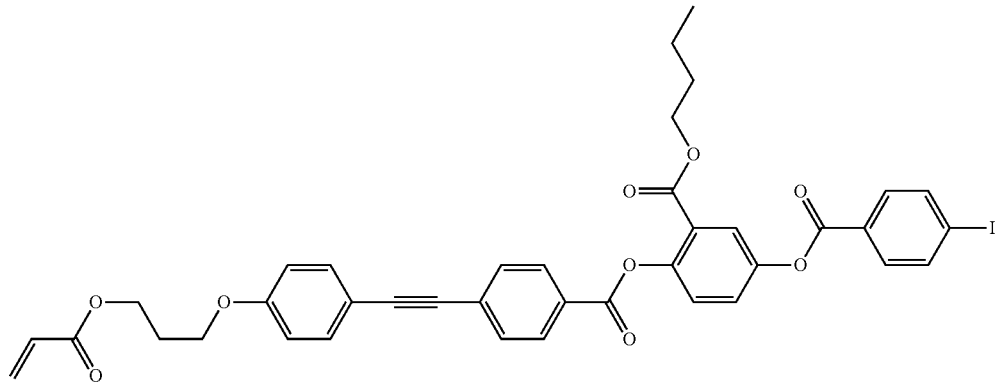 [SMILES: C=CC(=O)OCCCOc1ccc(C#Cc2ccc(C(=O)Oc3ccc(OC(=O)c4ccc(I)cc4)cc3C(=O)OCCCC)cc2)cc1]

The title compound 64 is prepared according to the process described in example 7 for compound 7 with the proviso that 5-[4-[2-[4-(6-hydroxyhexoxy)phenyl]ethynyl]benzoyl]oxy-2-(4-iodobenzoyl)oxy-benzoate is replaced by butyl 2-[4-[2-[4-(3-hydroxypropoxy)phenyl]-ethynyl]-benzoyl]oxy-5-(4-iodobenzoyl)oxy-benzoate compound 48. A purification by flash chromatography over silica gel using ethyl acetate affords a brown oily residue which is suspended in acetonitrile. The obtained precipitate is filtered off and dried under vacuo to result in the title compound (1.18 g, 1.53 mmol, 44%) as a brownish solid.

Liquid crystal phase Transition: Compound 64 is observed with a polarizing microscope under cross polarizers to determine its phase transition temperature. As a result, when the temperature increases, the crystalline phase changes into nematic phase at 85° C. ($T_{(Cr-N)}$) and the isotropic phase appears to be above 115° C. ($T_{(N-I)}$).

$^1$H NMR (300 MHz) in DMSO-$d_6$: 8.17 (m, 2H), 8.03 (m, 2H), 7.91 (m, 3H), 7.74 (m, 3H), 7.55 (m, 3H), 7.02 (m, 2H), 6.34 (m, 1H), 6.19 (m, 1H), 5.95 (m, 1H), 4.28 (t, 2H), 4.12 (m, 4H), 2.10 (m, 2H), 1.19 (m, 4H), 0.72 (t, 3H).

Example 65: Preparation of butyl 2,5-bis[[4-[2-[4-(3-prop-2-enoyloxypropoxy)phenyl]-ethynyl]benzoyl]oxy]benzoate, Compound 65

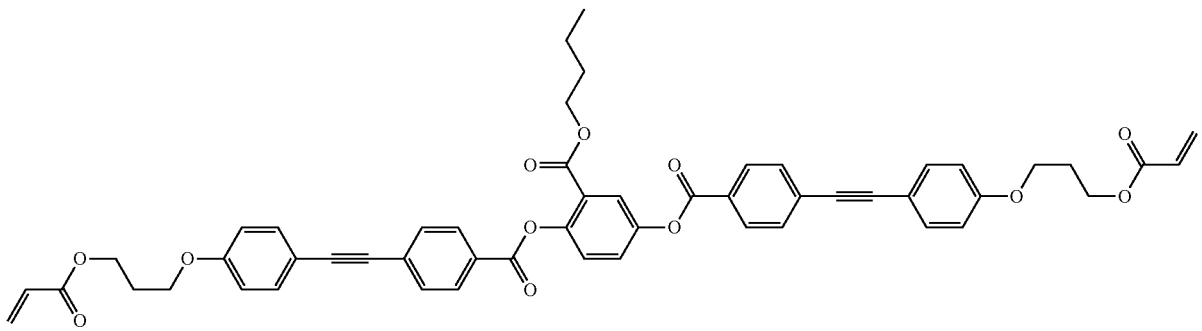 [SMILES: C=CC(=O)OCCCOc1ccc(C#Cc2ccc(C(=O)Oc3ccc(OC(=O)c4ccc(C#Cc5ccc(OCCCOC(=O)C=C)cc5)cc4)c(C(=O)OCCCC)c3)cc2)cc1]

The title compound 65 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by butyl 2,5-bis[[4-[2-[4-(3-hydroxypropoxy)phenyl]ethynyl]-benzoyl]oxy]benzoate compound 49. A purification by flash chromatography over silica gel using ethyl acetate provides the title compound (4.9 g, 5.6 mmol, 71%) as a white solid.

Liquid crystal phase Transition: Compound 65 is observed with a polarizing microscope under cross polarizers to determine its phase transition temperature. As a result, when the temperature increases, the crystalline phase changes into nematic phase at 115° C. ($T_{(Cr-N)}$) and the isotropic phase appears to be above 200° C. ($T_{(N-I)}$).

$^1$H NMR (300 MHz) in DMSO-$d_6$: 8.17 (m, 4H), 7.93 (d, 1H), 7.75 (m, 5H), 7.56 (m, 5H), 7.03 (m, 4H), 6.34 (m, 2H), 6.19 (m, 2H), 5.95 (m, 2H), 4.28 (t, 4H), 4.12 (m, 6H), 2.10 (m, 4H), 1.38 (m, 2H), 1.21 (m, 2H), 0.73 (t, 3H).

Example 66: Preparation of methyl 2,5-bis[[4-[2-[6-(6-prop-2-enoyloxyhexoxy)-2-naphthyl]ethynyl]benzoyl]oxy]benzoate, Compound 66

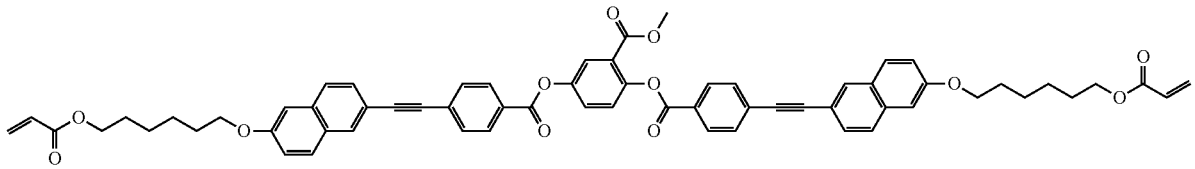 [SMILES: C=CC(=O)OCCCCCCOc1ccc2cc(C#Cc3ccc(C(=O)Oc4ccc(OC(=O)c5ccc(C#Cc6ccc7cc(OCCCCCCOC(=O)C=C)ccc7c6)cc5)c(C(=O)OC)c4)cc3)ccc2c1]

The title compound 66 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by methyl 2,5-bis[[4-[2-[6-(6-hydroxyhexoxy)-2-naphthyl]-ethynyl]benzoyl]oxy]benzoate compound 50.

Liquid crystal phase Transition: Compound 66 is observed with a polarizing microscope under cross polarizers to determine its phase transition temperature. As a result, when the temperature increases, the crystalline phase changes into nematic phase at 164° C. ($T_{(Cr-N)}$) and the isotropic phase appears to be above 200° C. ($T_{(N-I)}$).

$^1$H NMR (300 MHz) in $CD_2Cl_2$-$d_2$: 8.22 (m, 4H), 8.04 (m, 3H), 7.94 (m, 2H), 7.75 (m, 7H), 7.56 (m, 2H), 7.35 (d, 1H), 7.17 (m, 4H), 6.41 (m, 2H), 6.13 (m, 2H), 5.86 (m, 2H), 4.13 (m, 8H), 3.76 (s, 3H), 1.86 (m, 2H), 1.73 (m, 2H), 1.53 (m, 4H).

Example 67: Preparation of butyl 2,5-bis[[4-[2-[6-(6-prop-2-enoyloxyhexoxy)-2-naphthyl]ethynyl]benzoyl]oxy]benzoate, Compound 67

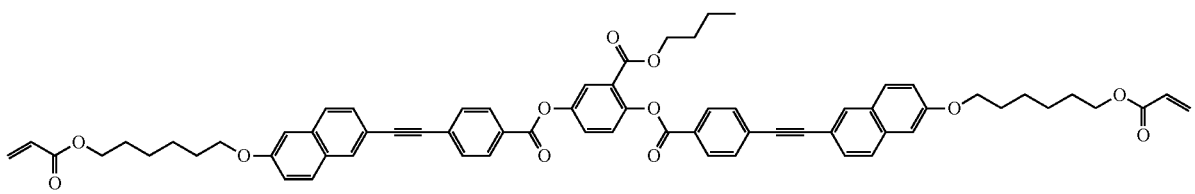 [SMILES: C=CC(=O)OCCCCCCOc1ccc2cc(C#Cc3ccc(C(=O)Oc4ccc(OC(=O)c5ccc(C#Cc6ccc7cc(OCCCCCCOC(=O)C=C)ccc7c6)cc5)c(C(=O)OCCCC)c4)cc3)ccc2c1]

The title compound 67 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by butyl 2,5-bis[[4-[2-[6-(6-hydroxyhexoxy)-2-naphthyl]-ethynyl]benzoyl]oxy]benzoate compound 51.

Liquid crystal phase Transition: Compound 67 is observed with a polarizing microscope under cross polarizers to determine its phase transition temperature. As a result, when the temperature increases, the crystalline phase changes into nematic phase at 120° C. ($T_{(Cr-N)}$) and the isotropic phase appears to be above 200° C. ($T_{(N-I)}$).

$^1$H NMR (300 MHz) in $CD_2Cl_2$-$d_2$: 8.23 (m, 4H), 8.03 (m, 3H), 7.93 (m, 2H), 7.74 (m, 7H), 7.55 (m, 2H), 7.34 (m, 1H), 7.18 (m, 4H), 6.37 (m, 2H), 6.12 (m, 2H), 5.81 (m, 2H), 4.15 (m, 10H), 1.86 (m, 4H), 1.73 (m, 4H), 1.52 (m, 10H), 1.28 (m, 2H), 0.83 (t, 3H).

Example 69: Preparation of butyl 2,5-bis[[4-[2-[4-(3-prop-2-enoyloxypropylsulfanyl)-phenyl]ethynyl]benzoyl]oxy]benzoate, Compound 69

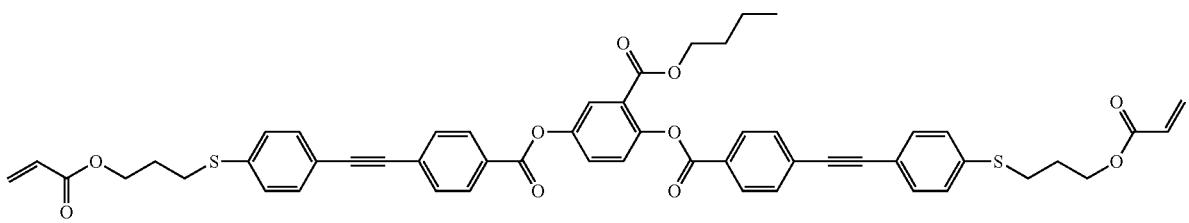 [SMILES: C=CC(=O)OCCCSc1ccc(C#Cc2ccc(C(=O)Oc3ccc(OC(=O)c4ccc(C#Cc5ccc(SCCCOC(=O)C=C)cc5)cc4)c(C(=O)OCCCC)c3)cc2)cc1]

The title compound 69 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by butyl 2,5-bis[[4-[2-[4-(3-hydroxypropylsulfanyl)phenyl]-ethynyl]benzoyl]oxy]benzoate compound 53. A purification by flash chromatography over silica gel using ethyl acetate provides the title compound (1.05 g, 1.15 mmol, 57%) as a white sticky solid.

Liquid crystal phase Transition: Compound 69 is observed with a polarizing microscope under cross polarizers to determine its phase transition temperature. As a result, when the temperature increases, the crystalline phase changes into nematic phase at 110° C. ($T_{(Cr-N)}$) and the isotropic phase appears to be above 200° C. ($T_{(N-I)}$).

$^1$H NMR (300 MHz) in DMSO-d$_6$: 8.18 (m, 4H), 7.93 (d, 1H), 7.74 (m, 5H), 7.57 (m, 5H), 7.40 (m, 4H), 6.35 (m, 2H), 6.19 (m, 2H), 5.96 (m, 2H), 4.22 (m, 4H), 4.13 (m, 2H), 3.12 (m, 4H), 1.96 (m, 4H), 1.40 (m, 2H), 1.19 (m, 2H), 0.73 (t, 3H).

Example 70: Preparation of [3-(1,3-benzothiazol-2-yl)-4-[4-[2-[4-(6-prop-2-enoyloxyhexoxy)phenyl]ethynyl]benzoyl]oxy-phenyl]4-[2-[4-(6-prop-2-enoyloxyhexoxy)phenyl]ethynyl]benzoate, compound 70

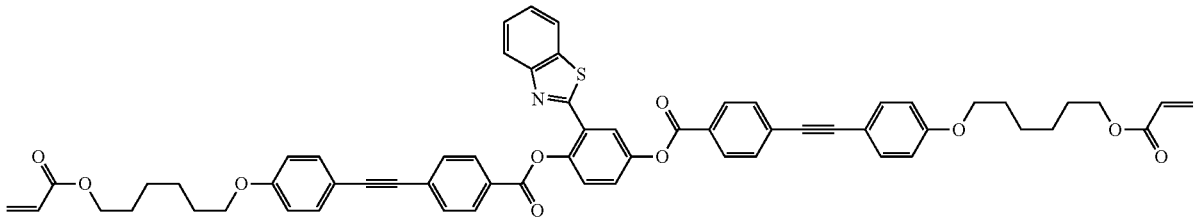 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c(-c4nc5ccccc5s4)c3)cc2)cc1]

The title compound 70 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by [3-(1,3-benzothiazol-2-yl)-4-[4-[2-[4-(6-hydroxyhexoxy)-phenyl]ethynyl]benzoyl]oxy-phenyl]-4-[2-[4-(6-hydroxyhexoxy)phenyl]ethynyl]-benzoate compound 54. A purification by flash chromatography over silica gel using ethyl acetate provides the title compound (2.23 g, 2.24 mmol) as an off-white solid.

Liquid crystal phase Transition: Compound 70 is observed with a polarizing microscope under cross polarizers to determine its phase transition temperature. As a result, when the temperature increases, the crystalline phase changes into nematic phase at 135° C. ($T_{(Cr-N)}$) and the isotropic phase appears to be above 200° C. ($T_{(N-I)}$).

$^1$H NMR (300 MHz) in DMSO-d$_6$: 8.29 (m, 4H), 8.12 (d, 1H), 7.89 (d, 1H), 7.80 (m, 4H), 7.71 (m, 2H), 7.50 (m, 6H), 6.32 (m, 2H), 6.19 (m, 2H), 5.92 (m, 2H), 4.13 (m, 4H), 4.02 (m, 4H), 1.74 (m, 4H), 1.68 (m, 4H), 1.45 (m, 8H).

Example 71: Preparation of [4-[4-[2-[4-(6-prop-2-enoyloxyhexoxy)phenyl]ethynyl]-benzoyl]oxy-1-naphthyl]4-[2-[4-(6-prop-2-enoyloxyhexoxy)phenyl]ethynyl]benzoate Compound 71

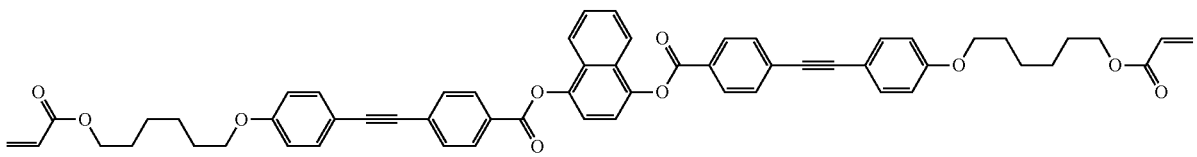 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c4ccccc34)cc2)cc1]

The title compound 71 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by [4-[2-[4-(6-hydroxyhexoxy)phenyl]ethynyl]benzoyl]oxy-1-naphthyl]4-[2-[4-(6-hydroxyhexoxy)phenyl]-ethynyl] benzoate compound 55. A purification by flash chromatography over silica gel using ethyl acetate provides the title compound (4.69 g, 5.16 mmol) as a grey solid.

Liquid crystal phase Transition: Compound 71 is observed with a polarizing microscope under cross polarizers to determine its phase transition temperature. As a result, when the temperature increases, the crystalline phase changes into nematic phase at 177° C. ($T_{(Cr-N)}$) and the isotropic phase appears to be above 200° C. ($T_{(N-I)}$).

$^1$H NMR (300 MHz) in DMSO-$d_6$: 8.30 (m, 3H), 8.06 (m, 2H), 7.98 (m, 2H), 7.80 (m, 4H), 7.68 (m, 2H), 7.58 (m, 5H), 7.02 (m, 4H), 6.33 (m, 2H), 6.17 (m, 2H), 5.93 (m, 2H), 4.12 (t, 4H), 4.03 (m, 4H), 1.74 (m, 4H), 1.65 (m, 4H), 1.43 (m, 8H).

Example 72: Preparation of 11-[4-(4-cyanophenyl)phenoxy]undecyl 2,5-bis[[4-[2-[4-(6-Prop-2-enoyloxyhexoxy)phenyl]ethynyl]benzoyl]oxy]benzoate Compound 72

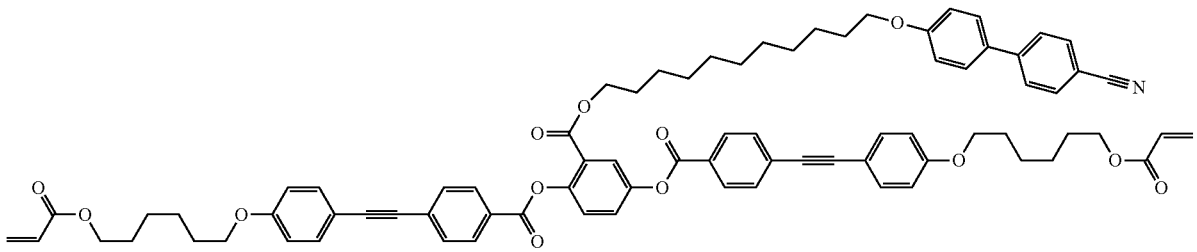 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c(C(=O)OCCCCCCCCCCCOc4ccc(-c5ccc(C#N)cc5)cc4)c3)cc2)cc1]

The title compound 72 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by 11-[4-(4-cyanophenyl)phenoxy]undecyl 2,5-bis[[4-[2-[4-(6-hydroxyhexoxy)phenyl]ethynyl]benzoyl]-oxy]benzoate compound 56.

Liquid crystal phase Transition: Compound 72 is observed with a polarizing microscope under cross polarizers to determine its phase transition temperature. As a result, when the temperature increases, the crystalline phase changes into nematic phase at 105° C. ($T_{(Cr-N)}$) and the isotropic phase appears to be above 200° C. ($T_{(N-I)}$).

$^1$H NMR (300 MHz) in $CD_2Cl_2$-$d_2$: 8.19 (m, 4H), 7.92 (d, 1H), 7.68 (m, 8H), 7.53 (m, 7H), 7.32 (d, 1H), 6.97 (m, 2H), 6.90 (m, 4H), 6.37 (m, 2H), 6.13 (m, 2H), 5.81 (m, 2H), 4.15 (m, 6H), 3.99 (m, 6H), 1.70 (m, 8H), 1.48 (m, 12H), 1.25 (m, 14H).

Example 73: Preparation of 10-[4-(4-cyanophenyl)phenoxy]decyl 2,5-bis[[4-[2-[4-(6-prop-2-enoyloxyhexoxy)phenyl]ethynyl]benzoyl]oxy]benzoate, Compound 73

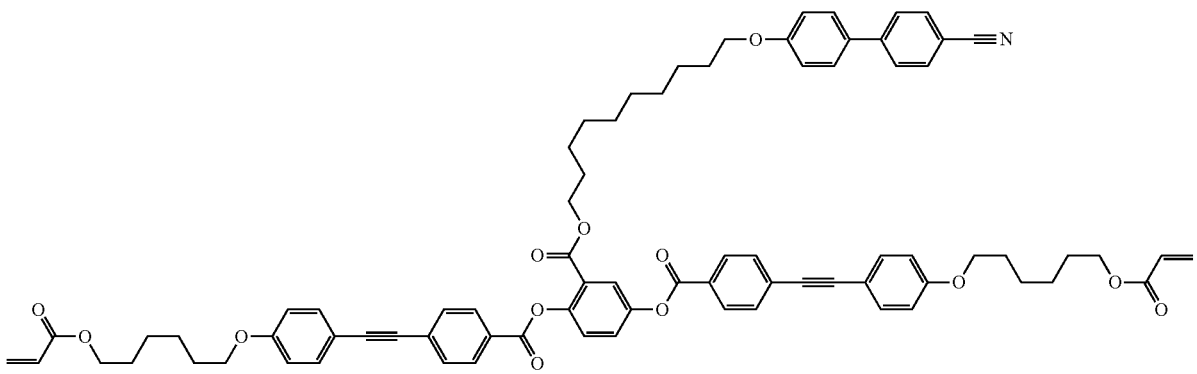 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c(C(=O)OCCCCCCCCCCOc4ccc(-c5ccc(C#N)cc5)cc4)c3)cc2)cc1]

The title compound 73 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by 10-[4-(4-cyanophenyl)phenoxy]decyl 2,5-bis[[4-[2-[4-(6-hydroxyhexoxy)phenyl]ethynyl]benzoyl]oxy]-benzoate compound 57. A purification by flash chromatography over silica gel using ethyl acetate provides the title compound (3.24 g, 2.62 mmol) as a white solid.

Liquid crystal phase Transition: Compound 73 is observed with a polarizing microscope under cross polarizers to determine its phase transition temperature. As a result, when the temperature increases, the crystalline phase changes into nematic phase at 125° C. ($T_{(Cr-N)}$) and the isotropic phase appears to be above 200° C. ($T_{(N-I)}$).

$^1$H NMR (300 MHz) in DMSO-$d_6$: 8.18 (m, 4H), 7.92 (d, 1H), 7.84 (m, 4H), 7.75 (m, 4H), 7.68 (m, 2H), 7.55 (m, 5H), 6.99 (m, 7H), 6.32 (m, 2H), 6.17 (m, 2H), 5.93 (m, 2H), 4.10 (m, 6H), 4.02 (m, 2H), 3.95 (m, 4H), 1.66 (m, 8H), 1.27 (m, 24H).

Example 74: Preparation of 8-[4-(4-cyanophenyl)phenoxy]octyl 2,5-bis[[4-[2-[4-(6-prop-2-enoyloxyhexoxy)phenyl]ethynyl]benzoyl]oxy]benzoate, Compound 74

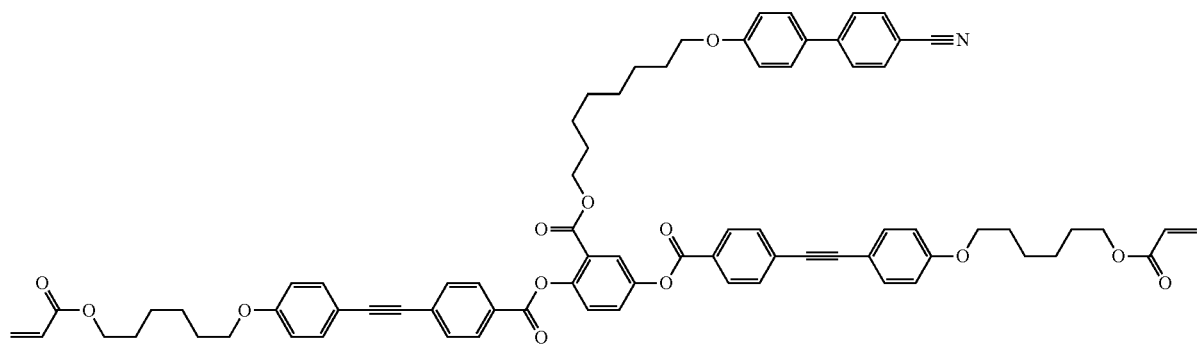 [SMILES: C=CC(=O)OCCCCCCOc1ccc(C#Cc2ccc(C(=O)Oc3ccc(OC(=O)c4ccc(C#Cc5ccc(OCCCCCCOC(=O)C=C)cc5)cc4)c(C(=O)OCCCCCCCCOc4ccc(-c5ccc(C#N)cc5)cc4)c3)cc2)cc1]

The title compound 74 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by 8-[4-(4-cyanophenyl)phenoxy]octyl 2,5-bis[[4-[2-[4-(6-hydroxyhexoxy)phenyl]ethynyl]benzoyl]oxy]-benzoate compound 58. A purification by flash chromatography over silica gel using ethyl acetate provides the title compound (6.28 g, 5.19 mmol) as a white solid.

Liquid crystal phase Transition: Compound 74 is observed with a polarizing microscope under cross polarizers to determine its phase transition temperature. As a result, when the temperature increases, the crystalline phase changes into nematic phase at 110° C. ($T_{(Cr-N)}$) and the isotropic phase appears to be above 200° C. ($T_{(N-I)}$).

$^1$H NMR (300 MHz) in DMSO-$d_6$: 8.17 (m, 4H), 7.93 (d, 1H), 7.83 (m, 4H), 7.74 (m, 4H), 7.65 (m, 2H), 7.53 (m, 5H), 6.98 (m, 7H), 6.33 (m, 2H), 6.17 (m, 2H), 5.93 (m, 2H), 4.12 (m, 6H), 4.02 (m, 2H), 3.93 (m, 4H), 1.67 (m, 8H), 1.36 (m, 12H), 1.15 (m, 8H).

Example 75: Preparation of 10-[4-(4-cyanophenyl) phenoxy]decyl 2,5-bis[[4-[2-[4-(3-prop-2-enoyloxy-propoxy)phenyl]ethynyl]benzoyl]oxy]benzoate, Compound 75

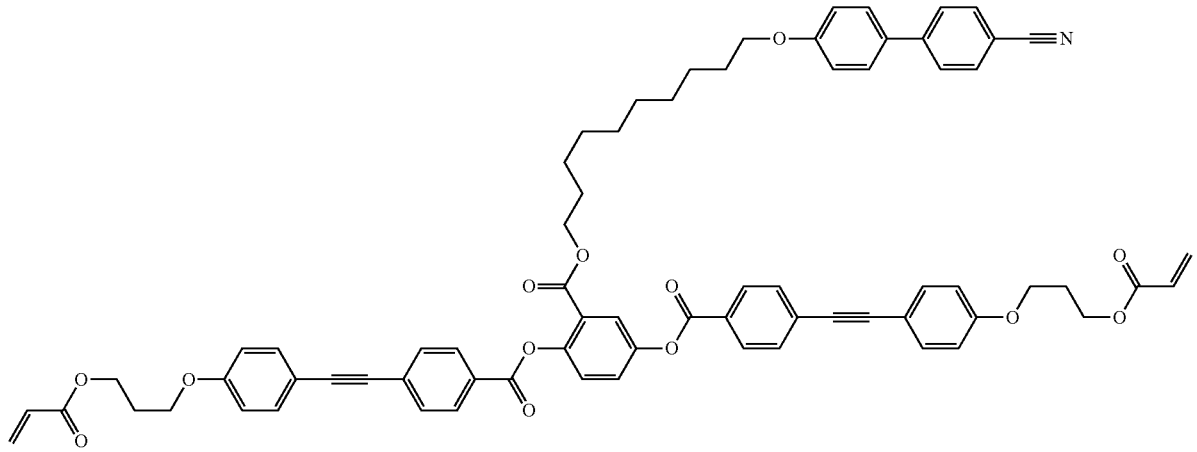 [SMILES: C=CC(=O)OCCCOc1ccc(C#Cc2ccc(C(=O)Oc3ccc(OC(=O)c4ccc(C#Cc5ccc(OCCCOC(=O)C=C)cc5)cc4)c(C(=O)OCCCCCCCCCCOc4ccc(-c5ccc(C#N)cc5)cc4)c3)cc2)cc1]

The title compound 75 is prepared according to the process described in example 9 for compound 9 with the proviso that methyl 2,5-bis[[4-[2-[4-(6-hydroxyhexoxy)phenyl]ethynyl]benzoyl]oxy]benzoate is replaced by 10-[4-(4-cyanophenyl)phenoxy]decyl 2,5-bis[[4-[2-[4-(3-hydroxypropoxy)phenyl]ethynyl]benzoyl]oxy]-benzoate compound 59. A purification by flash chromatography over silica gel using ethyl acetate provides the title compound (3.41 g, 2.95 mmol) as a white solid.

Liquid crystal phase Transition: Compound 9 is observed with a polarizing microscope under cross polarizers to determine its phase transition temperature. As a result, when the temperature increases, the crystalline phase changes into nematic phase at 116° C. ($T_{(Cr-N)}$) and the isotropic phase appears to be above 200° C. ($T_{(N-I)}$).

$^1$H NMR (300 MHz) in DMSO-$d_6$: 8.17 (m, 4H), 7.93 (d, 1H), 7.84 (m, 4H), 7.76 (m, 4H), 7.66 (m, 2H), 7.55 (m, 5H), 7.01 (m, 7H), 6.33 (m, 2H), 6.20 (m, 2H), 5.95 (m, 2H), 4.26 (m, 4H), 4.12 (m, 6H), 3.96 (m, 2H), 2.08 (m, 4H), 1.67 (m, 2H), 1.23 (m, 14H).

Example 76: Preparation of methyl 5-[4-[2-(4-cyanophenyl)ethynyl]benzoyl]oxy-2-[4-[2-[4-(6-prop-2-enoyloxyhexoxy)phenyl]ethynyl]benzoyl]oxy-benzoate, Compound 76

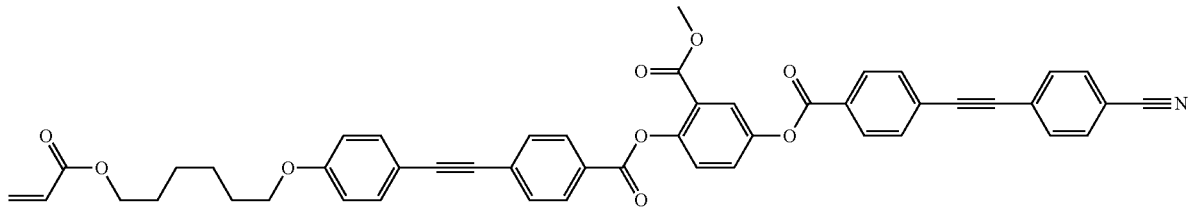 [SMILES: C=CC(=O)OCCCCCCOc1ccc(C#Cc2ccc(C(=O)Oc3ccc(OC(=O)c4ccc(C#Cc5ccc(C#N)cc5)cc4)cc3C(=O)OC)cc2)cc1]

2-(4-Iodobenzoyl)oxy-5-[4-[2-[4-(6-prop-2-enoyloxyhexoxy)phenyl]ethynyl]benzoyl]oxy-benzoate (1.0 g, 1.29 mmol), 4-ethynylbenzonitrile (0.2 g, 1.55 mmol), Pd(PPh$_3$)$_2$Cl$_2$ (0.05 g, 0.07 mmol), copper iodide (0.025 g, 0.13 mmol) and triphenylphosphine (0.034 g, 0.13 mmol) are suspended in 40 ml of triethylamine. The mixture is stirred at 40° C. for 5 h and after cooling to 25° C. poured onto ice water. The precipitation is filtered off and purified by flash chromatography over silica gel using a 2:1 mixture of heptane/ethyl acetate to give the title compound (0.25 g, 0.32 mmol) as a white solid.

Liquid crystal phase Transition: Compound 76 is observed with a polarizing microscope under cross polarizers to determine its phase transition temperature. As a result, when the temperature increases, the crystalline phase changes into nematic phase at 117° C. ($T_{(Cr-N)}$) and the isotropic phase appears to be above 200° C. ($T_{(N-I)}$).

$^1$H NMR (300 MHz) in DMSO-$d_6$: 8.19 (m, 4H), 7.94 (m, 3H), 7.84 (m, 4H), 7.75 (m, 3H), 7.56 (m, 3H), 7.01 (m, 2H), 6.32 (m, 1H), 6.18 (m, 1H), 5.94 (m, 1H), 4.12 (t, 2H), 4.02 (t, 2H), 3.71 (s, 3H), 1.69 (m, 4H), 1.42 (m, 4H).

Example 77: Preparation of an Orientation Layer Using Photoalignment Materials

A glass substrate is spin-coated with a Photoalignment Composition (3% solid content of a photoaligning material in cyclopentanone as described in the patent publication WO2012/085048: photoactive polymer materials use as orienting layer for liquid crystals). The film is dried at 180° C. for 10 min and the resulting film thickness is about 100 nm. Then, the film is exposed to aligning light, which is collimated and linearly polarized UV (LPUV) light (280-

320 nm) with 500 mJ/cm². The plane of polarization is 0° with regard to a reference edge on the substrate.

Example 78: Preparation of Optical Film from Compound 7

A 15.0 w % solution is prepared by mixing the 14.775 w % compound 7, 0.150 w % of Irgacure®369 (having the chemical structure of 2-Benzyl-2-dimethylamino-1-(4-morpholinophenyl)-butanone-1), 0.075 w % of Tinuvin®123 (having the chemical structure of Bis(1-octyloxy-2,2,6,6-tetramethyl-4-piperidyl)sebacate) in cyclopentanone and stirred thoroughly till the solid is completely dissolved at room temperature. The above polymer solution was spin-coated onto a glass plate with the orientation layer of Example 1 to form a liquid crystal film. This film is dried at 180° C. for 5 min onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 79: Preparation of Optical Film from Compound 9

A 15.0 w % solution is prepared by mixing the 14.775 w % compound 9, 0.150 w % of Irgacure® 369, 0.075 w % of Tinuvin®123 in cyclopentanone and stirred thoroughly till the solid is completely dissolved at room temperature. The above polymer solution was spin-coated onto a glass plate with the orientation layer of Example 1 to form a liquid crystal film. This film is dried at different temperatures for different amounts of time onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting films exhibit a medium oriented nematic mesophase at room temperature.

Example 80: Preparation of Optical Film from Compound 61

A 15.0 w % solution is prepared by mixing the 14.775 w % compound 61, 0.150 w % of Irgacure® 369, 0.075 w % of Tinuvin®123 in cyclopentanone and stirred thoroughly till the solid is completely dissolved at room temperature. The above polymer solution was spin-coated onto a glass plate with the orientation layer of Example 1 to form a liquid crystal film. This film is dried at 150° C. for 3 sec onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 81: Preparation of Optical Film from Compound 62

A 15.0 w % solution is prepared by mixing the 14.775 w % compound 62, 0.150 w % of Irgacure® 369, 0.075 w % of Tinuvin®123 in cyclopentanone and stirred thoroughly till the solid is completely dissolved at room temperature. The above polymer solution was spin-coated onto a glass plate with the orientation layer of Example 1 to form a liquid crystal film. This film is dried at 130° C. for 3 min onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 82: Preparation of Optical Film from Compound 63

A 15.0 w % solution is prepared by mixing the 14.775 w % compound 63, 0.150 w % of Irgacure® 369, 0.075 w % of Tinuvin®123 (from BASF) in cyclopentanone and stirred thoroughly till the solid is completely dissolved at room temperature. The above polymer solution was spin-coated onto a glass plate with the orientation layer of Example 1 to form a liquid crystal film. This film is dried at 180° C. for 3 sec onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 83: Preparation of Optical Film from Compound 64

A 15.0 w % solution is prepared by mixing the 14.775 w % compound 64, 0.150 w % of Irgacure® 369, 0.075 w % of Tinuvin®123 in cyclopentanone and stirred thoroughly till the solid is completely dissolved at room temperature. The above polymer solution was spin-coated onto a glass plate with the orientation layer of Example 1 to form a liquid crystal film. This film is dried at 130° C. for 3 sec onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 84: Preparation of Optical Film from Compound 65

A 15.0 w % solution is prepared by mixing the 14.775 w % compound 65, 0.150 w % of Irgacure® 369, 0.075 w % of Tinuvin®123 in cyclopentanone and stirred thoroughly till the solid is completely dissolved at room temperature. The above polymer solution was spin-coated onto a glass plate with the orientation layer of Example 1 to form a liquid crystal film. This film is dried at 180° C. for 5 sec onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 85: Preparation of Optical Film from Compound 69

A 15.0 w % solution is prepared by mixing the 14.520 w % compound 69, 0.300 w % of Irgacure® 369, 0.150 w % of Tinuvin®123 and 0.030 w % of BYK®378 (Polyether-modified polydimethylsiloxane from BYK used as surface additive) in cyclopentanone and stirred thoroughly till the solid is completely dissolved at room temperature. The above polymer solution was spin-coated onto a glass plate with the orientation layer of Example 1 to form a liquid crystal film. This film is dried at 120° C. for 1 min onto a temperature controlled hot plate. The sample is photo-polymerised by irradiation with UV light using a Mercury lamp for approximately 2 min at 120° C. under $N_2$ atmosphere to fix the orientation state of the liquid crystal.

The resulting film exhibited a very well oriented nematic mesophase at room temperature.

Example 86: Preparation of Optical Film from Compound 70

A 13.0 w % solution is prepared by mixing the 12.584 w % compound 70, 0.260 w % of Irgacure® 369, 0.130 w % of Tinuvin®123 and 0.026 w % of BYK®378 in 1,3-dioxolane and stirred thoroughly till the solid is completely dissolved at 80° C. The above polymer solution was spin-coated onto a glass plate with the orientation layer of Example 1 to form a liquid crystal film. This film is dried at 120° C. for 2 min onto a temperature controlled hot plate. The sample is photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 87

The retardation at 550 nm of the sample described in example 78, example 80, example 81, example 82, example 83, example 84, example 85, example 86 are measured with an Ellipsometer. The thicknesses of the samples are measured by a contact stylus profilometer. The birefringence ($\Delta n$) was obtained from the determined retardation and thickness values according to the formula ($\Delta n$=Retardation/Thickness). The values are listed in Table 1.

TABLE 1

| Example | Thickness [nm] | Retardation at 550 nm [nm] | $\Delta n$ at 550 nm |
|---|---|---|---|
| 78 (compound 7) | 585 ± 30 | 176.1 | 0.31 ± 0.01 |
| 80 (compound 61) | 670 ± 30 | 229.1 | 0.34 ± 0.01 |
| 81 (compound 62) | 465 ± 30 | 124.8 | 0.27 ± 0.02 |
| 82 (compound 63) | 520 ± 30 | 169.4 | 0.33 ± 0.02 |
| 83 (compound 64) | 390 ± 30 | 113.1 | 0.29 ± 0.02 |
| 84 (compound 65) | 685 ± 30 | 231.5 | 0.34 ± 0.01 |
| 86 (compound 70) | 1000 ± 30 | 297.3 | 0.30 ± 0.01 |

The films of Example 78, 80, 82, 83, 84, 86 have high birefringence with values above 0.29. These new LCPs could be used for preparing phase retarder optical films as Quarter-Waveplate (QWP) and Half-Waveplate (HWP). A retarder transmits light and modifies its polarization state and is widely used in various display application or in security elements. The particularly high birefringence of these new LCPs leads to a significant thickness reduction of the retarder's films.

As an example, Table 2 shows the required thickness to get a quarter waveplate ($\lambda/4$) retarder (QWP) and Half-Waveplate ($\lambda/2$) retarder (HWP) at 550 nm with the compounds 7, 61, 62, 63, 64, 65, 70 used in respectively example 78, 80, 81, 82, 83, 84 and 86.

TABLE 2

| Example | Required Thickness for QWP at 550 nm (nm) | Required Thickness for HWP at 550 nm (nm) |
|---|---|---|
| 78 | 444 | 888 |
| 80 | 404 | 808 |
| 81 | 509 | 1018 |
| 82 | 417 | 834 |
| 83 | 474 | 948 |
| 84 | 404 | 808 |
| 86 | 458 | 916 |

The invention claimed is:

1. A compound of formula (I)

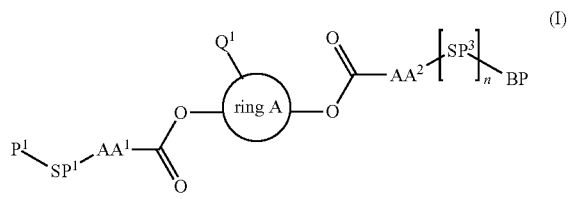

wherein the ring A is an unsubstituted or substituted phenylene group, naphthalene group or biphenylene group, $AA^1$ is selected from the groups (a), (b) and (c):

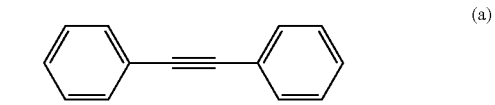

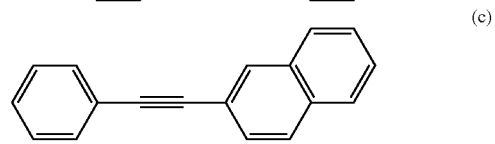

$AA^2$ is selected from the groups (a), (b), (c), (d) and (e):

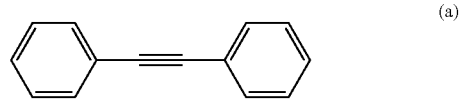

-continued

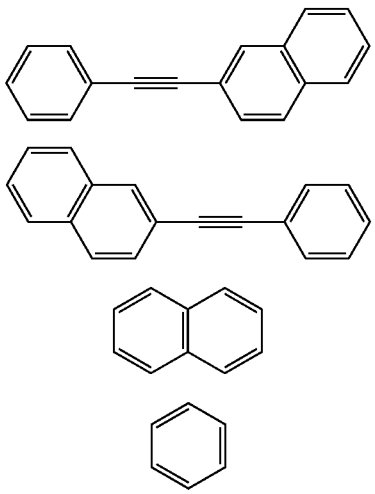

wherein AA$^1$ and AA$^2$ are independently from each other unsubstituted or substituted with one or two substituents selected from the group consisting of F, Cl, Br, I, CN, C$_1$-C$_6$alkyl, C$_1$-C$_6$ alkenyl, C$_1$-C$_6$alkoxy and C$_1$-C$_6$alkenyloxy, Q$^1$ is an unsubstituted or substituted homocyclic or heterocyclic group, or Q$^1$ is selected from unsubstituted or substituted groups of formulae (Ia), (Ib), (Ic) and (Id):

—COO—SP$^2$—BB (Ia),

—OCO—SP$^2$—BB (Ib),

—CO—SP$^2$—BB (Ic) and

—O—SP$^2$—BB (Id), with the proviso that the substituents of Q$^1$ are selected from the group consisting of F, Cl, Br, I, CN, C$_1$-C$_6$alkyl, C$_1$-C$_6$ alkenyl, C$_1$-C$_6$alkoxy and C$_1$-C$_6$alkenyloxy; and with the proviso that if the ring A is a naphthalene group Q$^1$ has the above given meaning or is hydrogen;

SP$^1$, SP$^2$ and SP$^3$ independently from each other represents a single bond or a spacer group of the formula —(CH$_2$) p- in which p is an integer of 1 to 18 and in which one, two, three or four —CH$_2$— groups are unreplaced or replaced by a group selected from the group consisting of —CH=CH—, —O—, —S—, —CO—, —COO—, —CONR'—, —OCOO—, —OCONR', —NR'—, —CONR'—, —OCOO—, —OCONR', wherein R' is selected from the group consisting of hydrogen, a C$_1$-C$_6$ alkyl group and a C$_1$-C$_6$ alkenyl group; with the proviso that the spacer group does not contain two adjacent heteroatoms;

n is 0 or 1,

BP is a polymerizable group or F, Cl, Br, I, CN, C$_1$-C$_6$alkyl, C$_1$-C$_6$ alkenyl, C$_1$-C$_6$alkoxy or C$_1$-C$_6$alkenyloxy, P$^1$ is a polymerizable group, with the proviso that if BP and P$^1$ are polymerizable groups, they are identical or different;

BB is hydrogen or a group of formula (II)

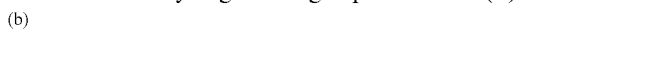

in which

A and B independently represent an unsubstituted or substituted six membered homocyclic or heterocyclic group or a naphthalene group;

C is selected from the group consisting of a five and six membered homocyclic or heterocyclic group or a naphthalene group;

n$^1$ and n$^2$ are 0 or 1 with the proviso that firstly $1 \leq n^1 + n^2 \leq 2$ and secondly, when C is a naphthalene group $0 \leq n^1 + n^2 \leq 2$;

Z$^1$ is selected from the group consisting of —O—, —S—, —COO—, —OOC—, —CO—, —CONR'—, —NR'CO—, —OCOO—, —OCONR'—, —NR'COO— and a single bond; in which R' is selected from the group consisting of hydrogen, a C$_1$-C$_6$ alkyl group and a C$_1$-C$_6$ alkenyl group;

with the proviso that the —SP$^2$—Z$^1$— group does not contain two adjacent heteroatoms;

Z$^2$ and Z$^3$ are independently from each other selected from the group consisting of single bond, —COO—, —OOC—, —CH$_2$—CH$_2$—, —CH$_2$O—, —OCH$_2$—, —CH=CH—, —C≡C—, —(CH$_2$)$_4$— and —(CH$_2$)$_3$O—;

R$^1$ is selected from the group consisting of H, —CN, —COR, —COOR, —OCOR, —CONR'R, —NR'COR, OCOOR, —OCONR'R, —NR'COOR, —F, —Cl, I, —CF$_3$, —OCF$_3$, —OR, in which R' is selected from the group consisting of hydrogen, a C$_1$-C$_6$ alkyl group and a C$_1$-C$_6$ alkenyl group, and R is selected from the group consisting of hydrogen, a C$_{1-18}$alkyl group and a C$_{4-18}$alkenyl group with the double bond at 3-position or higher.

2. A compound according to claim 1, wherein the polymerizable groups of BP and P$^1$ independently from each other are preferably selected from the group consisting of CH$_2$=C(Ph)-, CH$_2$=CW—COO—, CH$_2$=CH—COO-Ph-, CH$_2$=CW—CO—NH—, CH$_2$=CH—O—, CH$_2$=CH—OOC—, Ph-CH=CH—, CH$_2$=CH-Ph—, CH$_2$=CH-Ph-O—, R$_6$-Ph-CH=CH—COO—, R$_6$—OOC—CH=CH-Ph-O— and 2-W-epoxyethyl, in which W represents hydrogen, chloride, aryl or a C$_1$-C$_6$alkyl, R$_6$ represents a C$_1$-C$_6$alkyl with the proviso that when R$_6$ is attached to an aryl group it may also represent hydrogen or a C$_1$-C$_6$alkoxy.

3. A compound according to claim 1, in which SP$^1$ and SP$^3$ each independently from each other represents a single bond or a spacer group of the formula —(CH$_2$)p- in which p is an integer of 1 to 12, and in which one —CH$_2$— group is unreplaced or replaced by a group selected from the group consisting of —O— or —S—; and SP$^2$ represents a single bond or a spacer group of the formula —(CH$_2$)p- in which p is an integer of 1 to 12, preferably an integer from 1 to 10, and in which one —CH$_2$— group is unreplaced or replaced by a group selected from the group consisting of —O— or —S—.

4. A compound according to claim 1, in which BB is hydrogen or a group of formula (II)

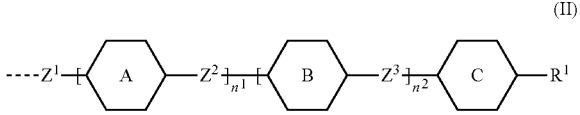
(II)

in which
A and B independently represent an unsubstituted or substituted 1,4-phenylene group or naphthalene group;
C is unsubstituted or substituted 1,4-phenylene group or naphthalene group;
$n^1$ and $n^2$ are 0 or 1 with the proviso that firstly $1 \leq n^1+n^2 \leq 2$ and secondly, when C is a naphthalene group $0 \leq n^1+n^2 \leq 2$;
with the proviso that the —$SP^2$—$Z^1$— group does not contain two adjacent heteroatoms;
$Z^2$ and $Z^3$ are independently selected from the group consisting of a single bond, —COO— and —OOC—;
$R^1$ is selected from the group consisting of H, —CN and I.

5. A compound according to claim 1, in which BP is a polymerizable group, or $C_1$-$C_4$alkyl, I or —CN.

6. A compound according to claim 1, in which n is 1, BP is a polymerizable group.

7. A LCP mixture comprising the compound of formula (I) according to claim 1.

8. A LCP network comprising a compound according to claim 1.

9. A method comprising use of a compound according to claim 1, in the manufacture of an optical or an electro-optical device.

10. An optical or electro-optical device including a compound according to claim 1.

11. A LCP network comprising a mixture according to claim 7 in cross-linked or polymerised form.

12. A method comprising using a mixture according to claim 7 in the manufacture of an optical or an electro-optical device.

13. An optical or electro-optical device including a mixture according to claim 7.

14. An optical or electro-optical device including a network according to claim 8.

15. A compound according to claim 3, in which in which $SP^1$ and $SP^3$ each independently from each other represents a single bond or a spacer group of the formula —$(CH_2)p$- in which p is an integer from 1 to 6, and in which one —$CH_2$— group is unreplaced or replaced by a group selected from the group consisting of —O— or —S—; and $SP^2$ represents a single bond or a spacer group of the formula —$(CH_2)p$- in which p is an integer of 1 to 12, and in which one —$CH_2$— group is unreplaced or replaced by a group selected from the group consisting of —O— or —S—.

16. A compound according to claim 3, in which in which $SP^1$ and $SP^3$ each independently from each other represents a single bond or a spacer group of the formula —$(CH_2)p$- in which p is an integer of 1 to 12, and in which one —$CH_2$— group is unreplaced or replaced by a group selected from the group consisting of —O— or —S—; and $SP^2$ represents a single bond or a spacer group of the formula —$(CH_2)p$- in which p is an integer from 1 to 10, and in which one —$CH_2$— group is unreplaced or replaced by a group selected from the group consisting of —O— or —S—.

17. A compound according to claim 3, in which in which $SP^1$ and $SP^3$ each independently from each other represents a single bond or a spacer group of the formula —$(CH_2)p$- in which p is an integer from 1 to 6, and in which one —$CH_2$— group is unreplaced or replaced by a group selected from the group consisting of —O— or —S—; and $SP^2$ represents a single bond or a spacer group of the formula —$(CH_2)p$- in which p is an integer from 1 to 10, and in which one —$CH_2$— group is unreplaced or replaced by a group selected from the group consisting of —O— or —S—.

* * * * *